US012748607B2

(12) United States Patent
Harvey

(10) Patent No.: US 12,748,607 B2
(45) Date of Patent: Sep. 29, 2026

(54) SYSTEMS AND METHODS FOR DYNAMICALLY GENERATING AN INSTRUCTIONAL INTERFACE

(71) Applicant: State Farm Mutual Automobile Insurance Company, Bloomington, IL (US)

(72) Inventor: Brian N. Harvey, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 110 days.

(21) Appl. No.: 18/582,104

(22) Filed: Feb. 20, 2024

(65) Prior Publication Data

US 2024/0289145 A1 Aug. 29, 2024

Related U.S. Application Data

(60) Provisional application No. 63/486,580, filed on Feb. 23, 2023.

(51) Int. Cl.

| | |
|---|---|
| ***G06F 9/451*** | (2018.01) |
| ***G06T 19/00*** | (2011.01) |
| ***G07C 5/00*** | (2006.01) |
| *B60R 21/00* | (2006.01) |

(52) U.S. Cl.

CPC ............ *G06F 9/451* (2018.02); *G06T 19/006* (2013.01); *G07C 5/008* (2013.01); *B60R 2021/0027* (2013.01)

(58) Field of Classification Search

CPC ....... G06F 9/451; G06T 19/006; G07C 5/008; B60R 2021/0027

See application file for complete search history.

(56) References Cited

U.S. PATENT DOCUMENTS

| | | | | |
|---|---|---|---|---|
| 9,934,625 | B1 * | 4/2018 | Wahba | G07C 5/008 |
| 11,734,969 | B1 | 8/2023 | Liu et al. | |
| 11,989,785 | B1 | 5/2024 | Suizzo et al. | |
| 2005/0040937 | A1 * | 2/2005 | Cuddihy | G08B 25/016 340/436 |
| 2012/0146766 | A1 * | 6/2012 | Geisler | G07C 5/085 340/8.1 |
| 2015/0019533 | A1 * | 1/2015 | Moody | G06F 16/951 707/722 |
| 2019/0304207 | A1 * | 10/2019 | Light-Holets | G07C 5/008 |
| 2022/0366336 | A1 * | 11/2022 | Khasis | G08G 1/04 |
| 2023/0162396 | A1 * | 5/2023 | German | G01S 5/16 345/633 |

FOREIGN PATENT DOCUMENTS

| | | |
|---|---|---|
| CN | 108966136 A | 12/2018 |

* cited by examiner

*Primary Examiner* — Mahelet Shiberou

(74) *Attorney, Agent, or Firm* — Armstrong Teasdale LLP

(57) ABSTRACT

A computer system may include at least one memory and at least one processor in communication with the at least one memory. The processor may be programmed to: (1) receive collision data indicating that a vehicle has been involved in a collision; (2) identify, based upon the collision data, a model of the vehicle; (3) parse a database based upon the identified model of the vehicle to identify vehicle hazard information associated with the vehicle; (4) generate a user interface including the vehicle hazard information; and (5) provide content to a responder computing device that causes the responder computing device to display the vehicle hazard information.

20 Claims, 11 Drawing Sheets

SYSTEMS AND METHODS FOR DYNAMICALLY GENERATING AN INSTRUCTIONAL INTERFACE

CROSS-REFERENCE TO RELATED APPLICATIONS

This application claims the benefit of priority to U.S. Provisional Patent Application Ser. No. 63/486,580, filed Feb. 23, 2023, and entitled "SYSTEMS AND METHODS FOR DYNAMICALLY GENERATING AN INSTRUCTIONAL INTERFACE," the contents and disclosures of which are hereby incorporated in their entirety.

FIELD OF THE DISCLOSURE

The present disclosure relates to dynamically generating an interface for displaying instructional information, and more particularly, to computer-based systems and methods for dynamically generating an instructional information interface based upon collision data for assisting rescue personnel in safely extracting individuals from a vehicle.

BACKGROUND

Computing devices may be used to retrieve and display information in emergency situations. For example, responders to traffic collisions may need to extract occupants who have become trapped in a vehicle, which sometimes requires that rescue personnel make physical cuts to the vehicle (e.g., using a hydraulic rescue tool, or "jaws of life") to gain access to the interior of the vehicle. However, some vehicles may include locations that would be dangerous to cut through. In particular, electric vehicles (EVs) and hybrid vehicles may include batteries and high voltage wires, which could potentially cause injury to rescue personnel and/or occupants of the vehicle if accidently cut though or come into contact with.

For this reason, responders may utilize computing devices (e.g., by using search engines and/or web browsers to access manufacturer websites via the Internet) to retrieve information (e.g., schematics) regarding the vehicle to identify potential hazards. However, this may require that responders identify a model of the vehicle involved in the collision, which may be difficult if the vehicle has been damaged. Additionally, because rescue operations are time-sensitive, responders may have little time to study and retrieve information before the rescue operation must be completed.

Conventional techniques may include additional inadequacies, ineffectiveness, encumbrances, inefficiencies, and other drawbacks as well.

BRIEF SUMMARY

The present embodiments may relate to, inter alia, systems and methods for dynamically generating an instructional information interface based upon collision data for assisting rescue personnel in safely extracting individuals from a vehicle. A computer system may identify hazards in a vehicle and display the identified hazards in a graphical user interface or display screen.

In one aspect, a computer system for providing an instructional information interface may be provided. The system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, a computer system may include at least one memory and at least one processor in communication with the at least one memory. The processor may be programmed to: (1) receive collision data indicating that a vehicle has been involved in a collision; (2) identify, based upon the collision data, a model of the vehicle; (3) parse a database based upon the identified model of the vehicle to identify vehicle hazard information associated with the vehicle; (4) generate a user interface including the vehicle hazard information; and/or (5) provide content to a responder computing device that causes the responder computing device to display the vehicle hazard information. The computer system may include additional, less, or alternate functionality, including that discussed elsewhere herein.

In another aspect, a server computing device for providing an instructional information interface may be provided. The server computing device may include a processor in communication with a memory device. The processor may be configured to receive collision data from at least one of an occupant computing device or a vehicle computing device disposed in a vehicle, the collision data indicating that the vehicle has been involved in a collision. The processor may be further configured to identify, based upon the collision data, a model of the vehicle. The processor may be further configured to parse a database based upon the identified model of the vehicle to identify vehicle hazard information associated with the vehicle. The processor may be further configured to generate a user interface including the vehicle hazard information. The processor may be further configured to provide content to a responder computing device that causes the responder computing device to display the vehicle hazard information. The server computing device may include additional, less, or alternate functionality, including that discussed elsewhere herein.

In another aspect, a computer-implemented method for dynamically generating a safety information interface for a vehicle may be provided. The computer-implemented method may be implemented via one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the method may be performed by a server computing device including a processor in communication with a memory device. The computer-implemented may include (1) receiving, by the server computing device, collision data from at least one of an occupant computing device or a vehicle computing device disposed in the vehicle, the collision data indicating that the vehicle has been involved in a collision. The computer-implemented method may further include (2) identifying, by the server computing device, based upon the collision data, a model of the vehicle; and/or (3) parsing, by the server computing device, a database based upon the identified model of the vehicle to identify vehicle hazard information associated with the vehicle. The computer-implemented method may further include (4) generating, by the server computing device, a user interface including the vehicle hazard information; and/or (5) providing, by the server computing device, content to a responder computing device that causes the responder computing device to display the vehicle hazard information. The computer-implemented method may include additional, less, or alternate functionality, including that discussed elsewhere herein.

In another aspect, at least one non-transitory computer-readable storage media having computer-executable instructions embodied thereon may be provided. When executed by a server computing device including a processor in communication with a memory device, the computer-executable instructions may cause the processor to receive collision data from at least one of an occupant computing device or a vehicle computing device disposed in a vehicle, the collision data indicating that the vehicle has been involved in a collision. The computer-executable instructions may further cause the processor to identify, based upon the collision data, a model of the vehicle. The computer-executable instructions may further cause the processor to parse a database based upon the identified model of the vehicle to identify vehicle hazard information associated with the vehicle. The computer-executable instructions may further cause the processor to generate a user interface including the vehicle hazard information. The computer-executable instructions may further cause the processor to provide content to a responder computing device that causes the responder computing device to display the vehicle hazard information. The at least one non-transitory computer-readable storage media may include additional, less, or alternate functionality, including that discussed elsewhere herein.

In another aspect, a computing device may be provided. The computing device may include a processor in communication with a memory device is provided. The processor may be configured to receive collision data relating to a vehicle involved in a collision. The processor may further be configured to identify, based upon the collision data, a model of the vehicle. The processor may further be configured to parse a database based upon the identified model of the vehicle to identify vehicle hazard information associated with the vehicle. The processor may further be configured to receive a video image of the vehicle from a responder computing device. The processor may further be configured to generate an overlay image to be displayed or overlayed (or displayed overlayed) over the received video image, the overlay image generated based upon the identified vehicle hazard information and the received video image. The processor may further be configured to provide content to the responder computing device that causes the responder computing device to display the overlay image over the video image. The computing device may include additional, less, or alternate functionality, including that discussed elsewhere herein.

In another aspect, a computing device may be provided. The computing device may include a processor in communication with a memory device. The processor may be configured to receive a video image of a vehicle involved in a collision from a responder computing device. The processor may further be configured to extract collision data from the received video image. The processor may further be configured to identify, based upon the extracted collision data, a model of the vehicle. The processor may further be configured to parse a database based upon the identified model of the vehicle to identify vehicle hazard information associated with the vehicle. The processor may further be configured to generate an overlay image to be displayed or overlayed (or displayed overlayed) over the received video image, the overlay image generated based upon the identified vehicle hazard information and the received video image. The processor may further be configured to provide content to the responder computing device that causes the responder computing device to display the overlay image over the video image. The computing device may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
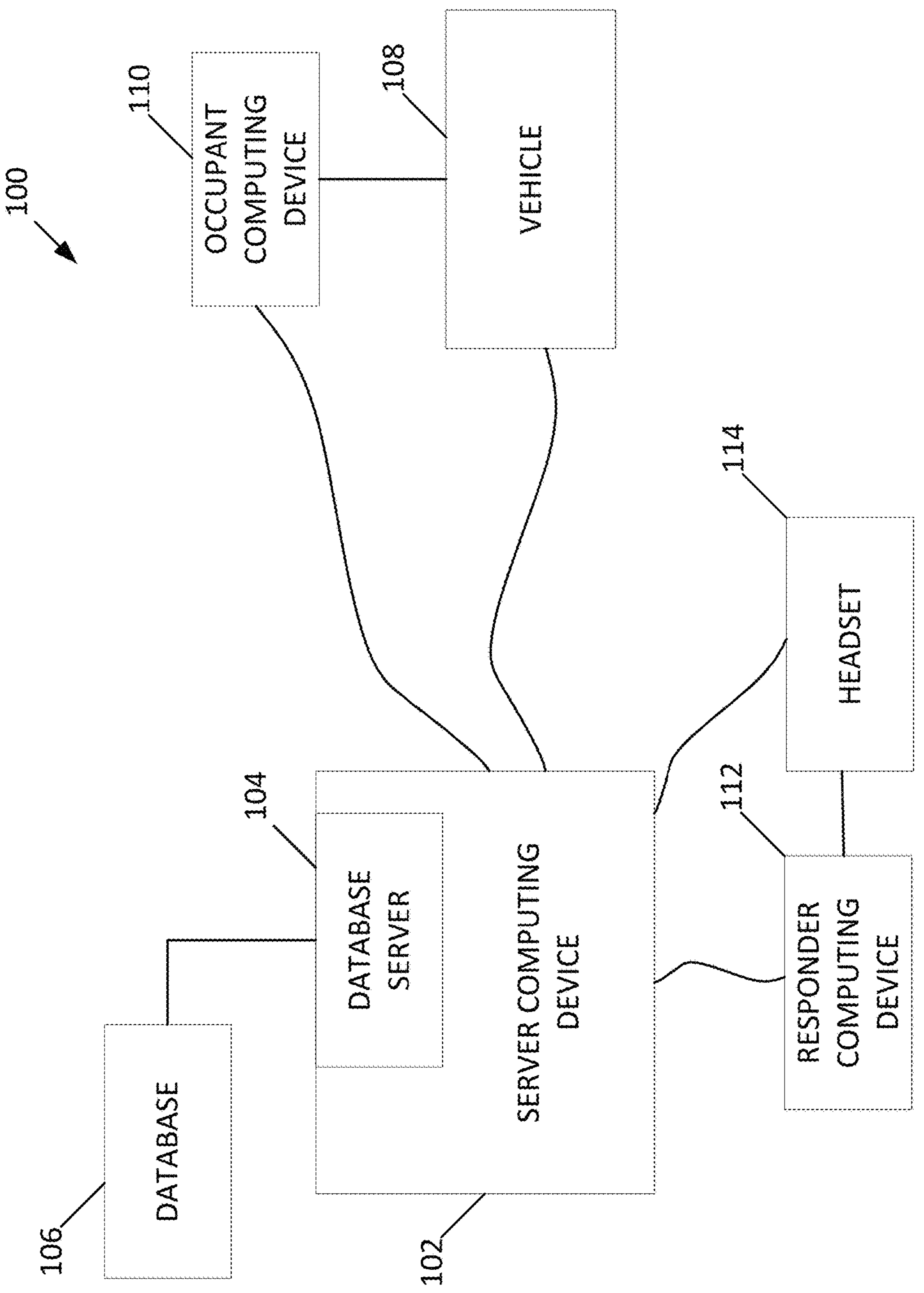
FIG. 1 depicts an exemplary computer system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for dynamically generating an interface that displays informative information (also referred to herein as safety information) to a user. For example, the systems and methods described herein may be configured to generate a user interface that displays safety information relating to a vehicle involved in an accident or collision for an end user to use in responding to that vehicle accident. In exemplary embodiments, the systems and methods may be performed by a server computing device. The server computing device may be configured to receive information, via a data input from a variety of sources, about a vehicle involved in a collision from which individuals need to be extracted by rescue personnel. Based upon this information, the server computing device may be configured to generate a user interface for providing safety information to rescue personnel (e.g., on a mobile device, tablet, a wearable, smart glasses, or other portable computing device). This information may include vehicle-specific information, such as locations within the vehicle where cuts may or may not be safely made for extracting trapped individuals from the vehicle. The interface may further include additional information, such as the number, identities, characteristics (e.g., whether any of the individuals are an infant), and/or medical status of those in the vehicle.

In the exemplary embodiment, a server computing device may receive data (referred to herein as "collision data") from an occupant computing device (e.g., a mobile phone carried by an occupant of the vehicle), a vehicle computing device (e.g., a computing device for a vehicle control and/or infotainment system) disposed in a vehicle, or another computing device (e.g., drones near the accident, emergency provider computing devices, other mobile devices at the scene of the accident, smart roads, smart signs, or any other computing devices that may have access to such data) having collision data. The collision data may include data indicating that the vehicle has been involved in a collision, telematics data, and/or other data relevant to rescue personnel responding to the collision.

In the exemplary embodiment, the server computing device may be further configured to identify, based upon the collision data, a model of the vehicle (e.g., the vehicle's manufacturer, model name, trim level, etc.), which may be relevant to determining locations of potential hazards in the vehicle. For example, electric vehicles and hybrid vehicles may include batteries and/or high voltage wires, the locations of which may depend on the specific model.

In the exemplary embodiment, the server computing device may be further configured to parse a database based upon the identified model of the vehicle to identify vehicle hazard information associated with the vehicle. The vehicle hazard information may identify, for example, locations that would be dangerous for responders to access or cut though while rescuing occupants of the vehicle. The vehicle hazard information may be presented as a schematic diagram of the vehicle illustrating locations of the hazards with respect to the body of the vehicle. In some embodiments, the displayed schematic may be adjusted and/or annotated based upon collision data, for example, to illustrate damage and/or deformation that has occurred to the vehicle and/or to only show portions of the schematic relevant to the specific rescue operation (e.g., specific hazards and/or portions of the through which rescue personnel must pass to access trapped individuals). In some embodiments, the server computing device may utilize artificial intelligence (AI), machine learning, and/or chatbot programs (e.g., ChatGPT) to generate textual information to include in the user interface based upon the received collision data.

In the exemplary embodiment, the server computing device may generate a user interface including the vehicle hazard information and provide content to a responder computing device (e.g., a mobile phone or tablet carried by rescue personnel) that causes the responder computing device to display the vehicle hazard information (e.g., the vehicle schematic corresponding to the vehicle model). In some embodiments, the user interface may include additional information, such as a number of or identities of occupants of the vehicle and/or attributes of the collision (e.g., whether there was a front, rear, or side impact, rollover, other vehicles involved, etc.) which may be determined by the server computing device based upon collision data and/or telematics data received from the occupant computing device and/or vehicle.

In some embodiments, the user interface may include augmented reality (AR) and/or virtual reality (VR) display functionality, which may be displayed by the responder computing device and/or a headset (e.g., a Google Glass or Oculus Quest) worn by responders. The AR or VR display may include, for example, an actual image (e.g., a real-time video image captured by the responder computing device and/or headset) or a virtual image of the vehicle with vehicle hazard information added as an overlay image. For example, the overlay image including the vehicle hazard information may be shown overlayed over the received video image. In some embodiments, the responder computing device and/or headset may be capable of projecting the overlay onto the vehicle, so that rescue personnel attempting to gain access to the vehicle can directly see the overlay and corresponding locations of vehicle hazards.

Generating and Collecting Collision Data

In the exemplary embodiment, the server computing device is configured to receive collision data from which it may be determined that a collision has occurred and from which information important for responding to the collision (e.g., models of vehicles involved) may be determined. The collision data may include information, sometimes referred to herein as "vehicle information," describing a vehicle involved in a collision that needs to be accessed by rescue personnel (e.g., to extract trapped occupants of the vehicle). This vehicle information may include, for example, a vehicle identification number (VIN), a manufacturer, model, model year, trim level, options, or other such information. In some embodiments, the collision data may not include information describing the vehicle itself, but may include information from which the identity and/or model of the vehicle may be determined by the server computing device, such as identities of the driver and/or occupants (e.g., child or adult) of the vehicle and/or images of the vehicle, as described in further detail below.

In some embodiments, the received vehicle information may include information, sometimes referred to herein as "vehicle hazard information" regarding the structure of the vehicle, such as locations of the vehicle that would be dangerous or hazardous to cut though (e.g., locations including high-voltage conductors or flammable substances). Alternatively, the server computing device may be configured to retrieve vehicle hazard information (e.g., from a database and/or the Internet) in response to receiving the collision data. For example, the user computing device may identify a model of the vehicle based upon the collision data, and perform a lookup in a database to identify vehicle hazard data associated with the vehicle model.

In some embodiments, the server computing device may receive collision data from one or more user devices (e.g., mobile phones), referred to herein as "occupant computing devices," carried by individuals (e.g., drivers or passengers) involved in a collision. For example, the user devices may include sensors (e.g., accelerometers, gyroscopes, global positioning system (GPS), cameras, microphones, etc.) or otherwise be configured to receive data from sensors (e.g., sensors integrated into the vehicle). Such sensors may generate telematics data that describes, for example, the movement, status, and/or behavior of the vehicle. The user devices may be configured to execute a mobile application ("app") that causes the user device to collect, store, and transmit to the server computing device the generated telematics data.

In some embodiments, the collision data may be transmitted to and/or retrieved by the server computing device in response to a detection of a collision. For example, the app executing on the occupant computing device may cause the occupant computing device to detect when a collision has occurred (e.g., by detecting an acceleration or change in direction exceeding a predefined threshold), and transmit an indication to the server computing device that a collision may have occurred, along with other relevant collision data and/or telematics data. Alternatively, the occupant computing device may continuously transmit telematics data to the server computing device, and the server computing device may determine based upon the telematics data that a collision likely has occurred. In some embodiments, the telematics data and/or collision data transmitted by the user device may include vehicle data or other data based upon which a model of the vehicle may be determined. For example, the transmitted data may include an identifier associated with an owner of the user device (sometimes referred to herein as an "occupant identifier"), which may be used to perform a lookup in a database to identify any vehicles associated with the owner.

In some embodiments, the vehicle includes a vehicle computing device capable of communication with the server computing device (e.g., through a cellular, vehicle-to-vehicle (V2V), vehicle-to-infrastructure (V2I), vehicle-to-x (V2x), and/or other communications network). In such embodiments, similar to the occupant computing device describe above, the vehicle may be configured to transmit telematics data to the server computing device and/or detect a collision based upon sensor or telematics data (e.g., by comparing an acceleration or change in direction to a predefined threshold). The vehicle may include various sensors such as, for example, accelerometers, gyroscopes, GPS, cameras (e.g., outward-facing and/or passenger-facing cameras), microphones, and/or other sensors, which may be used to generate telematics data or other data based upon which the collision may be detected and determinations about the nature of the collision and/or occupants of the vehicle may be made.

In some embodiments, the occupant computing device and/or vehicle may transmit additional information to the server computing device in response to the detection of a collision. For example, if the vehicle has been registered (e.g., with the server computing device and/or in the database), and/or if one or more occupants of the vehicle are carrying user devices that have been registered (e.g., with the server computing device and/or in the database), the identities of the occupants may be determined (e.g., based upon their association with respective user devices and/or the vehicle in the database). For identified individuals, the server computing device may retrieve additional information, such as a name, physical description, and/or relevant medical information relating to the occupant.

Further, cameras and/or microphones of the user device and/or may be used to detect occupants of the vehicle and their respective positions. For example, a sound of crying is detected, the user device and/or server computing device may determine that an infant is present in the vehicle. Additionally, the user device and/or server computing device may utilize telematics data to determine attributes of collision, such as the location, severity, and/or nature of the collision (e.g., whether there was a front, rear, or side impact, rollover, other vehicles involved, etc.), and predict injuries that may have occurred to the occupants (e.g., by analyzing video obtained from passenger-facing cameras of the vehicle). In some embodiments, the server computing device is configured to utilize AI and/or machine learning techniques to make predictions about, for example, the nature of the collision, the identities of occupants of the vehicle, and/or possible injuries sustained by occupants of the vehicle, based upon received collision data and/or telematics data. As described in further detail below, such information may be transmitted to rescue personnel for assisting in responding to the collision.

In some embodiments, the server computing device may receive collision data from other user devices, such as those associated with rescue personnel or other responders to the collision. For example, a responder device (e.g., a smart phone and/or tablet) may be configured to execute an app that causes the responder device to capture images of the collision and/or vehicles involved in the collision (e.g., using a camera or other sensors of the responder device) and transmit the images to the server computing device for analysis. For example, the server computing device may utilize optical character recognition (OCR) to identify, for example, license plate numbers, VINs, and/or manufacturer logos located on the vehicle, which may then be used to obtain further information about the vehicle (e.g., by performing a lookup using the license plate number, VIN, or manufacturer logo).

In some embodiments, the server computer device may use AI and/or machine learning techniques to identify, for example, a model of the vehicle. For example, a machine learning model may be trained using various images of vehicles (e.g., including vehicles with collision damage) labeled with a corresponding vehicle model, so that the machine learning model may be configured to output a vehicle model based upon an input image of a vehicle. Similarly, AI or machine learning techniques may be applied to an image of the vehicle to identify, for example, attributes of the collision (e.g., whether there was a front, rear, or side impact, rollover, other vehicles involved, etc.). In some embodiments, rather than at the server computing device, some or all of this analysis of images may be performed at the responder computing device, and the derived information may then be transmitted to the server computing device.

In some embodiments, other types of devices may be used to retrieve collision data. For example drones near the collision, emergency provider computing devices, other mobile devices at the scene of the accident, smart roads, smart signs, or any other computing devices that may have access to collision data may transmit the collision data to the server computing device. In such embodiments, the server computing device may be configured identify such devices (e.g., based upon a geographic location of the device with respect to the site of the collision) and request collision data from the identified devices. Some devices, such as drones, may be deployed and controlled (e.g., directly or indirectly) by the server computing device in order to retrieve collision data.

In some embodiments, collision data, telematics data, images, sounds, or other data retrieved by the server computing device may be aggregated used to make determinations and/or predictions. For example, AI and/or machine learning techniques and/or other algorithms may be applied to this data to determine which vehicle models, geographic locations, driver or passenger characteristics, driving habits, or other factors that may be identified based upon this data are associated with a higher or lower likelihood of being involved in a collision.

Accordingly, such data may be used for determining insurance premiums and/or developing recommendations for drivers, vehicle manufacturers, agencies that manage roads, and/or rescue personnel for improving driving and vehicle safety. For example, if collisions frequently occur at a certain location, the server computing device may generate notifications for drivers who frequent this location to exercise caution, or for an agency managing roads at the location to take safety measures such as installing warning signs.

Generating a User Interface

In the exemplary embodiment, the server computing device is configured to generate a user interface. The user interface may be displayed by a user device such as the responder computing device described above. The user interface may display information about the vehicle involved in the collision, such as vehicle hazard information, to enable rescue personnel to safely extract occupants that may be trapped in the vehicle.

As described above, the vehicle information displayed by the may include schematics of the vehicle. For example, if the vehicle involved in the collision is an electric vehicle or a hybrid vehicle, the schematics may illustrate locations of high voltage wires or other locations of hazards that would be dangerous for rescue personnel to cut through while extracting occupants from the vehicle. In addition to vehicle hazard information, the user interface may include further information as described above, such as information about the occupants (e.g., number of occupants, identities, age, and/or medical information) or attributes of the collision (e.g., location of the collision, whether there was a front, rear, or side impact, rollover, other vehicles involved, etc.).

In some cases, the user interface may need to account for changes in shape of the vehicle (e.g., due to large and/or high-speed impacts or rollovers) resulting from the collision and the resulting changes in location of hazards within the vehicle resulting from the changes in shape. For example, the server computing device may predict a change in shape of the vehicle based upon the received collision data and adjust the schematics to reflect the state of the vehicle likely to be encountered by rescue personnel.

In some embodiments, the displayed schematic may be adjusted and/or annotated based upon collision data, for example, to illustrate damage and/or deformation that has occurred to the vehicle and/or to only show portions of the schematic relevant to the specific rescue operation (e.g., specific hazards and/or portions of the through which rescue personnel must pass to access trapped individuals). For example, if only a single occupant (e.g., a driver) is present in the vehicle, more of the user interface may be allocated to portions of the vehicle and/or specific vehicle hazards associated with rescuing the driver.

In some embodiments, the user interface including the vehicle information may be displayed through an app executing on, for example, the responder computing device. For example, in response to detecting the collision, the server computing device may generate content data configured to cause the responder computing device to display the user interface. The server computing device may identify one or more responder computing devices (e.g., based upon a geographic location of the collision) associated with rescue personnel who will likely respond to the detected collision. The server computing device may cause the app executing on the identified responder computing devices to generate a push notification, and/or transmit a text message, email, and/or other message, prompting a user of the responder computing device to open the app and access the user interface.

In some embodiments, the server computing device may utilize artificial intelligence (AI), machine learning, and/or chatbot programs (e.g., ChatGPT) to generate textual information to include in the user interface based upon the received collision data. In some such embodiments, responders may submit natural language queries (e.g., via text and/or voice), based upon which the server computing device may generate a response (e.g., including information derived from the collision data) to be presented within the user interface.

In some embodiments, the user interface may include AR or VR functionality. In one example, the responder computing device may be held so that a camera of the responder computing device captures an image of the vehicle involved in the collision, and the image may be displayed by the responder computing device along with overlayed information. For example, the locations of hazards (e.g., batteries, high voltage wires) and/or occupants of the vehicle may be shown as overlay on the image along with addition information (e.g., text labels).

In another example, the rescuer computing device may include or be configured for communication with an AR or VR headset (e.g., an Oculus Quest or Google Glass), which may display the overlay information within the responder's field of view as the responder looks at the vehicle. In either example, the display may be continually updated (e.g., based upon a location and angle of the camera and/or headset with respect to the vehicle), so that the overlay corresponds to an actual location of the hazards and/or occupants with respect to the camera and/or headset.

In some cases, the AR or VR interface may need to account for changes in shape of the vehicle (e.g., due to large and/or high-speed impacts or rollovers) resulting from the collision and the resulting changes in location of hazards within the vehicle resulting from the changes in shape. For example, the server computing device may predict a change in shape of the vehicle based upon the received collision data and update the overlay information accordingly. In some embodiments, the image of the vehicle may be saved and/or a virtual image of the vehicle may be generated, enabling responders to view the AR or VR interface without being present at the collision site.

In some embodiments, the responder computing device and/or headset may be further capable of projecting the AR or VR overlay onto the vehicle. For example, the responder computing device and/or headset may include a projector that the rescuer may orient towards the vehicle to illuminate the vehicle with the overlay pattern. Such a projected overlay enables rescue personnel attempting to gain access to the vehicle to directly see the overlay and corresponding locations of vehicle hazards on the actual vehicle.

In some embodiments, the server computing device may include additional content for inclusion in the user interface. For example, users may view a library of vehicle schematics and/or other information through the user interface, so that rescue personnel can research certain vehicles (e.g., electric and/or hybrid vehicle models commonly involved in collisions) prior to an occurrence of a collision. In some such embodiments, the user interface may include training videos illustrating how to safely rescue occupants from certain models of vehicles.

At least one technical problems addressed by this system may include: (a) inability of computing devices to identifying a vehicle involved in a collision and locations of potential hazards within the vehicle; (b) inability of computing devices to provide vehicle hazard information to rescue personnel without a need for the rescue personnel to manually perform searches using the computing device; and (c) inability of user interfaces to provide dynamic and/or real time information to responders specific to a vehicle involved in a collision.

A technical effect of the systems and processes described herein may be achieved by performing at least one of the following: (a) receiving collision data from at least one of an occupant computing device or a vehicle computing device disposed in a vehicle, the collision data indicating that the vehicle has been involved in a collision; (b) identifying, based upon the collision data, a model of the vehicle; (c) parsing a database based upon the identified model of the vehicle to identify vehicle hazard information associated with the vehicle; (d) generating a user interface including the vehicle hazard information; and (e) providing content to a responder computing device that causes the responder computing device to display the vehicle hazard information.

At least one technical effect achieved by this system may be one of: (a) ability computing devices to identifying a vehicle involved in a collision and locations of potential hazards within the vehicle by receiving data (e.g., collision data, telematics data, and/or images) from a vehicle and/or user device in response to the vehicle and/or user device detecting a collision; (b) ability of computing devices to provide vehicle hazard information to rescue personnel without a need for the rescue personnel to manually perform searches using the computing device by dynamically generating a vehicle-specific user interface in response to detecting a collision of the vehicle; and (c) improved user interfaces for provide dynamic and/or real time information to responders specific to a vehicle involved in a collision by automatically generating a vehicle-specific user interface in response to a detection of a collision, the user interface including graphically presented (e.g., as a schematic and/or an AR or VR interface) vehicle hazard information.

Exemplary Computer System

FIG. 1 depicts an exemplary computer system 100. Computer system 100 may include a server computing device 102 including a database server 104. Computer system 100 may further include, in communication with server computing device 102, one or more of a database 106, a vehicle 108, an occupant computing device 110, a responder computing device 112, and/or a headset 114. In some embodiments, occupant computing device 110 may be configured to be communicatively linked to vehicle 108, for example, via a physical and/or wireless (e.g., Bluetooth) connection. Similarly, in some embodiments, responder computing device 112 and/or headset 114 may be communicatively linked.

In the exemplary embodiment, server computing device 102 is configured to receive collision data from which it may be determined that a collision has occurred and from which information important for responding to the collision (e.g., models of vehicles involved) may be determined. The collision data may include vehicle information describing a vehicle (e.g., vehicle 108) involved in a collision that needs to be accessed by rescue personnel (e.g., to extract trapped occupants of vehicle 108). This vehicle information may include, for example, a VIN, a manufacturer, model, model year, trim level, options, or other such information. In some embodiments, the collision data may not include information describing vehicle 108 itself, but may include information from which the identity and/or model of vehicle 108 may be determined by server computing device 102, such as identities of the driver and/or occupants of vehicle 108 and/or images of vehicle 108, as described in further detail below.

In some embodiments, the received vehicle information may include vehicle hazard information relating to the structure of vehicle 108, such as locations of vehicle 108 that would be dangerous or hazardous to cut though (e.g., locations including high-voltage conductors or flammable substances). Alternatively, server computing device 102 may be configured to retrieve vehicle hazard information (e.g., from database 106 and/or the Internet) in response to receiving the collision data. For example, the user computing device may identify a model of vehicle 108 based upon the collision data, and perform a lookup in database 106 to identify vehicle hazard data associated with the vehicle model.

In some embodiments, server computing device 102 may receive collision data from one or more occupant computing devices 110 carried by individuals (e.g., drivers or passengers) involved in a collision. For example, the user devices may include sensors (e.g., accelerometers, gyroscopes, global positioning system (GPS), cameras, microphones, etc.) or otherwise be configured to receive data from sensors (e.g., sensors integrated into vehicle 108). Such sensors may generate telematics data that describes, for example, the movement, status, and/or behavior of vehicle 108. The user devices may be configured to execute a mobile app that causes the user device to collect, store, and transmit to server computing device 102 the generated telematics data.

In some embodiments, the collision data may be transmitted to and/or retrieved by server computing device 102 in response to a detection of a collision. For example, the app executing on occupant computing device 110 may cause occupant computing device 110 to detect when a collision has occurred (e.g., by detecting an acceleration or change in direction exceeding a predefined threshold), and transmit an indication to server computing device 102 that a collision may have occurred, along with other relevant collision data and/or telematics data. Alternatively, occupant computing device 110 may continuously transmit telematics data to server computing device 102, and server computing device 102 may determine based upon the telematics data that a collision likely has occurred.

In some embodiments, the telematics data and/or collision data transmitted by the user device may include vehicle data or other data based upon which a model of vehicle 108 may be determined. For example, the transmitted data may include an identifier associated with an owner of the user device (sometimes referred to herein as an "occupant identifier"), which may be used to perform a lookup in database 106 to identify any vehicles associated with the owner.

In some embodiments, vehicle 108 includes a vehicle computing device (such as that described in further detail below with respect to FIG. 4) capable of communication with server computing device 102 (e.g., through a cellular, V2V, V2I, V2x, and/or other communications network). In such embodiments, similar to occupant computing device 110 describe above, vehicle 108 may be configured to transmit telematics data to server computing device 102 and/or detect a collision based upon sensor or telematics data (e.g., by comparing an acceleration or change in direction to a predefined threshold). Vehicle 108 may include various sensors such as, for example, accelerometers, gyroscopes, GPS, cameras (e.g., outward-facing and/or passenger-facing cameras), microphones, and/or other sensors, which may be used to generate telematics data or other data based upon which the collision may be detected and determinations about the nature of the collision and/or occupants of vehicle 108 may be made.

In some embodiments, occupant computing device 110 and/or vehicle 108 may transmit additional information to server computing device 102 in response to the detection of a collision. For example, if vehicle 108 has been registered (e.g., with server computing device 102 and/or in database 106), and/or if one or more occupants of vehicle 108 are carrying user devices that have been registered (e.g., with server computing device 102 and/or in database 106), the identities of the occupants may be determined (e.g., based upon their association with respective user devices and/or vehicle 108 in database 106). For identified individuals, server computing device 102 may retrieve additional information, such as a name, physical description, and/or relevant medical information relating to the occupant.

Further, cameras and/or microphones of the user device and/or may be used to detect occupants of vehicle 108 and their respective positions. For example, a sound of crying is detected, the user device and/or server computing device 102 may determine that an infant is present in vehicle 108. Additionally, the user device and/or server computing device 102 may utilize telematics data to determine attributes of collision, such as the location, severity, and/or nature of the collision (e.g., whether there was a front, rear, or side impact, rollover, other vehicles involved, etc.), and predict injuries that may have occurred to the occupants (e.g., by analyzing video obtained from passenger-facing cameras of vehicle 108). In some embodiments, server computing device 102 is configured to utilize AI and/or machine learning techniques to make predictions about, for example, the nature of the collision, the identities of occupants of vehicle 108, and/or possible injuries sustained by occupants of vehicle 108, based upon received collision data and/or telematics data. As described in further detail below, such information may be transmitted to rescue personnel for assisting in responding to the collision.

In some embodiments, server computing device 102 may receive collision data from other user devices, such as responder computing device 112. For example, responder computing device 112 may be configured to execute an app that causes the responder device to capture images of the collision and/or vehicles involved in the collision (e.g., using a camera or other sensors of the responder device) and transmit the images to server computing device 102 for analysis. For instance, server computing device 102 may utilize OCR to identify, for example, license plate numbers, VINs, and/or manufacturer logos located on vehicle 108, which may then be used to obtain further information about vehicle 108 (e.g., by performing a lookup using the license plate number, VIN, or manufacturer logo).

In some embodiments, the server computer device may use AI and/or machine learning techniques to identify, for example, a model of vehicle 108. For example, a machine learning model may be trained using various images of vehicles (e.g., including vehicles with collision damage) labeled with a corresponding vehicle model, so that the machine learning model may be configured to output a vehicle model based upon an input image of a vehicle. Similarly, AI or machine learning techniques may be applied to an image of vehicle 108 to identify, for example, attributes of the collision (e.g., whether there was a front, rear, or side impact, rollover, other vehicles involved, etc.). In some embodiments, rather than at server computing device 102, some or all of this analysis of images may be performed at responder computing device 112, and the derived information may then be transmitted to server computing device 102.

In some embodiments, other types of devices may be used to retrieve collision data. For example drones near the collision, emergency provider computing devices, other mobile devices at the scene of the accident, smart roads, smart signs, or any other computing devices that may have access to collision data may transmit the collision data to the server computing device. In such embodiments, server computing device 102 may be configured identify such devices (e.g., based upon a geographic location of the device with respect to the site of the collision) and request collision data from the identified devices. Some devices, such as drones, may be deployed and controlled (e.g., directly or indirectly) by server computing device 102 in order to retrieve collision data.

In some embodiments, collision data, telematics data, images, sounds, or other data retrieved by server computing device 102 may be aggregated used to make determinations and/or predictions. For example, AI and/or machine learning techniques and/or other algorithms may be applied to this data to determine which vehicle models, geographic locations, driver or passenger characteristics, driving habits, or other factors that may be identified based upon this data are associated with a higher or lower likelihood of being involved in a collision.

Accordingly, such data may be used for determining insurance premiums and/or developing recommendations for drivers, vehicle manufacturers, agencies that manage roads, and/or rescue personnel for improving driving and vehicle safety. For example, if collisions frequently occur at a certain location, server computing device 102 may generate notifications for drivers who frequent this location to exercise caution, or for an agency managing roads at the location to take safety measures such as installing warning signs.

In the exemplary embodiment, server computing device 102 is configured to generate a user interface. The user interface may be displayed by a user device such as responder computing device 112. The user interface may display information about the vehicle involved in the collision, such as vehicle hazard information, to enable rescue personnel to safely extract occupants that may be trapped in the vehicle.

As described above, the vehicle information displayed by the may include schematics of the vehicle. For example, if the vehicle involved in the collision is an electric vehicle or a hybrid vehicle, the schematics may illustrate locations of high voltage wires or other locations of hazards that would be dangerous for rescue personnel to cut through while extracting occupants from the vehicle. In addition to vehicle hazard information, the user interface may include further information as described above, such as information about the occupants (e.g., number of occupants, identities, age, and/or medical information) or attributes of the collision (e.g., location of the collision, whether there was a front, rear, or side impact, rollover, other vehicles involved, etc.).

In some cases, the user interface may need to account for changes in shape of the vehicle (e.g., due to large and/or high-speed impacts or rollovers) resulting from the collision and the resulting changes in location of hazards within the vehicle resulting from the changes in shape. For example, server computing device 102 may predict a change in shape of the vehicle based upon the received collision data and adjust the schematics to reflect the state of the vehicle likely to be encountered by rescue personnel.

In some embodiments, the displayed schematic may be adjusted and/or annotated based upon collision data, for example, to illustrate damage and/or deformation that has occurred to the vehicle and/or to only show portions of the schematic relevant to the specific rescue operation (e.g., specific hazards and/or portions of the through which rescue personnel must pass to access trapped individuals). For example, if only a single occupant (e.g., a driver) is present in vehicle 108, more of the user interface may be allocated to portions of vehicle 108 and/or specific vehicle hazards associated with rescuing the driver.

In some embodiments, the user interface including the vehicle information may be displayed through an app executing on, for example, responder computing device 112. For example, in response to detecting the collision, server computing device 102 may generate content data configured to cause responder computing device 112 to display the user interface. Server computing device 102 may identify one or more responder computing devices 112 (e.g., based upon a geographic location of the collision) associated with rescue personnel who will likely respond to the detected collision. Server computing device 102 may cause the app executing on the identified responder computing devices 112 to generate a push notification, and/or transmit a text message, email, and/or other message, prompting a user of responder computing device 112 to open the app and access the user interface.

In some embodiments, server computing device 102 may utilize artificial intelligence (AI), machine learning, and/or chatbot programs (e.g., ChatGPT) to generate textual information to include in the user interface based upon the received collision data. In some such embodiments, responders may submit natural language queries (e.g., via text and/or voice) via responder computing device 112, based upon which server computing device 102 may generate a response (e.g., including information derived from the collision data) to be presented within the user interface.

In some embodiments, the user interface may include AR or VR functionality. In one example, responder computing device 112 may be held so that a camera of responder computing device 112 captures an image of the vehicle involved in the collision, and the image may be displayed by responder computing device 112 along with overlayed information. For example, the locations of hazards (e.g., batteries, high voltage wires) and/or occupants of the vehicle may be shown as overlay on the image along with addition information (e.g., text labels). In another example, the rescuer computing device may include or be configured for communication with an AR or VR headset 114 (e.g., an Oculus Quest or Google Glass), which may display the overlay information within the responder's field of view as the responder looks at the vehicle. In either example, the display may be continually updated (e.g., based upon a location and angle of the camera and/or headset 114 with respect to the vehicle), so that the overlay corresponds to an actual location of the hazards and/or occupants with respect to the camera and/or headset 114.

In some cases, the AR or VR interface may need to account for changes in shape of the vehicle (e.g., due to large and/or high-speed impacts or rollovers) resulting from the collision and the resulting changes in location of hazards within the vehicle resulting from the changes in shape. For example, server computing device 102 may predict a change in shape of the vehicle based upon the received collision data and update the overlay information accordingly. In some embodiments, the image of the vehicle may be saved and/or a virtual image of the vehicle may be generated, enabling responders to view the AR or VR interface without being present at the collision site.

In some embodiments, responder computing device 112 and/or headset 114 may be further capable of projecting the AR or VR overlay onto the vehicle. For example, responder computing device 112 and/or headset 114 may include a projector that the rescuer may orient towards vehicle 108 to illuminate vehicle 108 with the overlay pattern. Such a projected overlay enables rescue personnel attempting to gain access to vehicle 108 to directly see the overlay and corresponding locations of vehicle hazards on the actual vehicle.

In some embodiments, server computing device 102 may include additional content for inclusion in the user interface. For example, users may view a library of vehicle schematics and/or other information through the user interface, so that rescue personnel can research certain vehicles (e.g., electric and/or hybrid vehicle models commonly involved in collisions) prior to an occurrence of a collision. In some such embodiments, the user interface may include training videos illustrating how to safely rescue occupants from certain models of vehicles.

Exemplary Client Computing Device

Figure 2:
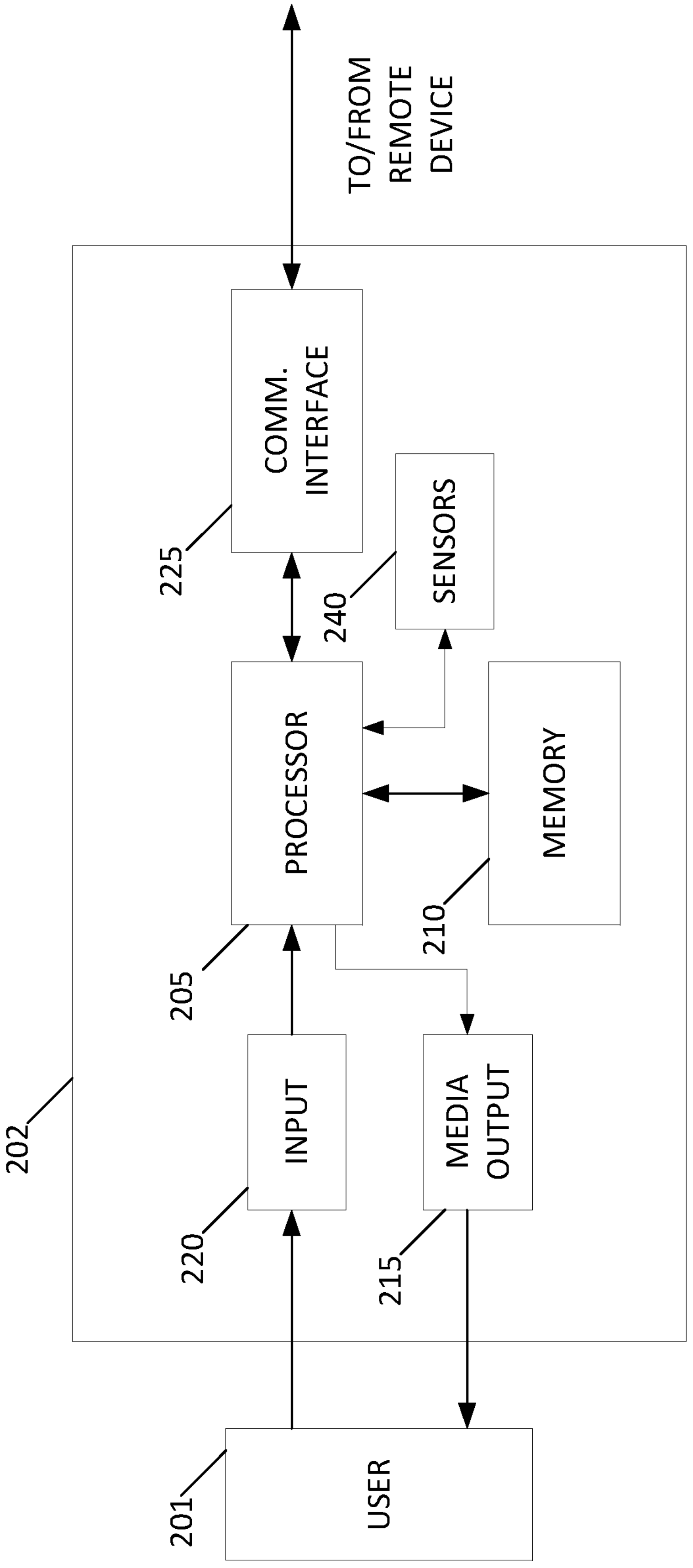
FIG. 2 depicts an exemplary client computing device that may be used with the exemplary computer system illustrated in FIG. 1.

FIG. 2 depicts an exemplary client computing device 202. Client computing device 202 may be, for example, at least one of occupant computing device 110, responder computing device 112, and/or headset 114 (all shown in FIG. 1), and/or a vehicle computing device of vehicle 108 (as described in further detail below with respect to FIG. 4).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In certain exemplary embodiments, client computing device 202 may also include at least one media output component 215 for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which can be communicatively coupled to a remote device such as server computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

In some embodiments, client computing device 202 may also include sensors 240. Sensors 240 may include, for example, an accelerometer, a global positioning system (GPS), or a gyroscope. Sensors 240 may be used to collect telematics data, which may be transmitted by client computing device 202 to a remote device such as server computing device 102 (shown in FIG. 1).

Stored in memory area 210 may be, for example, computer readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website. A client application may allow user 201 to interact with a server application from server computing device 102 (shown in FIG. 1).

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server System

Figure 3:
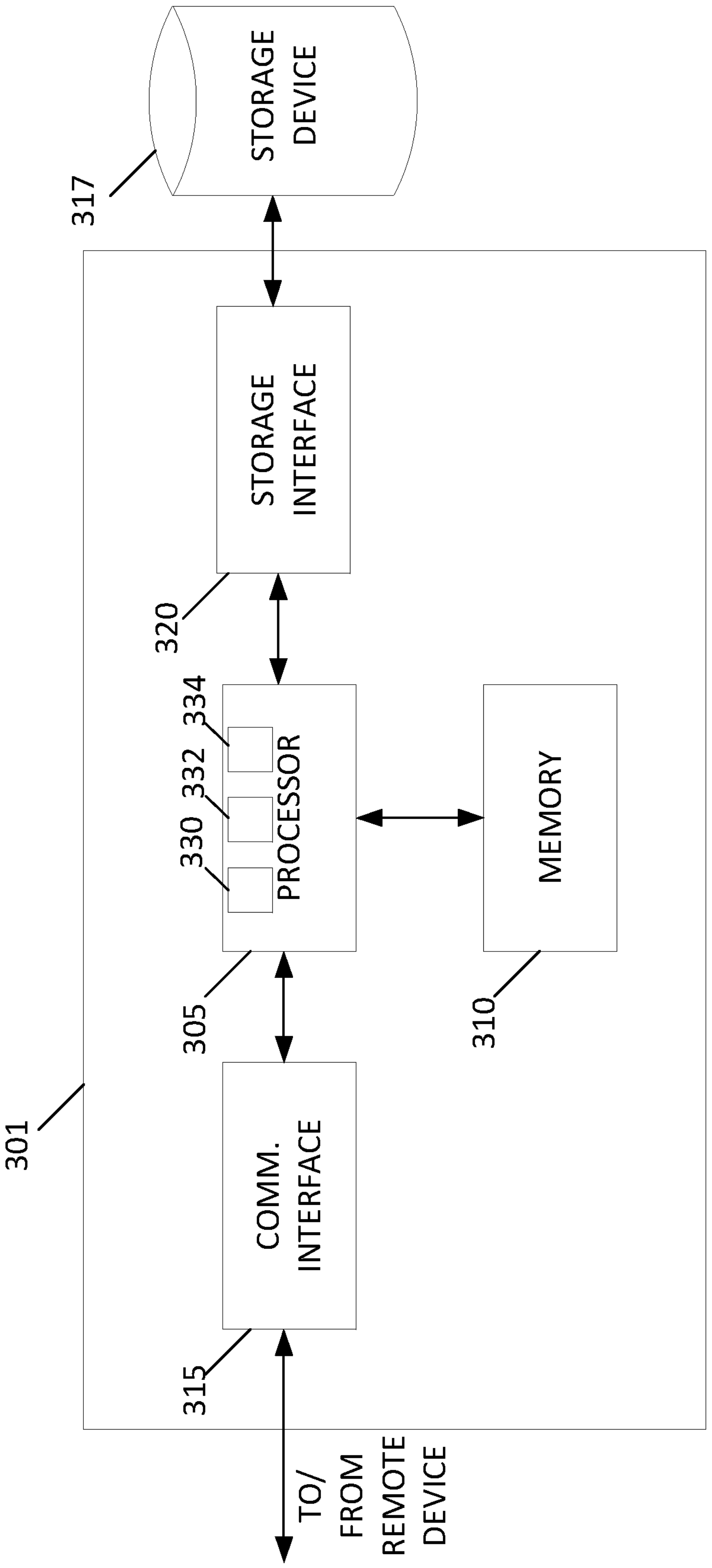
FIG. 3 depicts an exemplary server system that may be used with the exemplary computer system illustrated in FIG. 1.

FIG. 3 depicts an exemplary server system that may be used with computer system 100 illustrated in FIG. 1. Server system 301 may be, for example, server computing device 102 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 may be operatively coupled to a communication interface 315 such that server system 301 is capable of communicating with vehicle 108, occupant computing device 110, responder computing device 112, and/or headset 114 (all shown in FIG. 1), or another server system 301. For example, communication interface 315 may receive requests from occupant computing device 110, responder computing device 112, and/or headset 114 via the Internet.

Processor 305 may also be operatively coupled to a storage device 317, such as database 106 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317.

In other embodiments, storage device 317 may be external to server system 301 and may be accessed by a plurality of server systems 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

In exemplary embodiments, processor 305 may include and/or be communicatively coupled to one or more modules for implementing the systems and methods described herein. In some embodiments, processor 305 may include one or more of a communication module 330, an analytics module 332, and/or a graphics module 334.

In some embodiments, communications module 330 may be configured to orchestrate transmitting data to and receiving data from external devices such as, for example, vehicle 108, occupant computing device 110, responder computing device 112, and/or headset 114. For example, communication module may be configured to (1) receive collision data from at least one of occupant computing device 110 or a vehicle computing device disposed in vehicle 108, the collision data indicating that the vehicle has been involved in a collision; (2) provide content to responder computing device 112 that causes responder computing device 112 to display vehicle hazard information; (3) receive telematics data from at least one of occupant computing device 110 or a vehicle computing device of vehicle 108; (4) provide additional content to responder computing device 112 that causes responder computing device 112 to display a determined at least one attribute of a collision; (5) receive collision data in response to a detection of a collision by occupant computing device 110 and/or vehicle 108; (6) receive an occupant identifier from occupant computing device 110; (7) provide additional content to responder computing device 112 that causes the responder computing device to display a schematic; (8) provide additional content to responder computing device 112 that causes the responder computing device to display a number of occupants in vehicle 108; (9) cause at least one of responder computing device 112 or headset 114 to display the at least one of the AR or VR interface; and/or (10) receive a photographic image of vehicle 108 from at least one of responder computing device 112 or occupant computing device 110.

In some embodiments, analytics module 332 may be configured to make determinations based upon input data (e.g., collision data and/or telematics data), for example, by performing lookups and/or queries within databases (e.g., database 106), executing OCR and/or other algorithms, and/or by executing AI and/or machine learning techniques as described above. For example, analytics module 332 may be configured to (1) identify, based upon collision data, a model of vehicle 108; (2) parse a database (e.g., database 106) based upon the identified model of vehicle 108 to identify vehicle hazard information associated with vehicle 108; (3) detect a collision of vehicle 108 based upon received telematics data; (4) determine at least one attribute of the collision based upon the received telematics data; (5) perform a lookup to identify the model of a vehicle associated with an occupant identifier; (6) determine, based upon received collision data, a number of occupants in vehicle 108; (7) determine a geographic location of vehicle 108 based upon the received collision data; (8) select a responder computing device 112 on which to display the vehicle hazard information based upon the determined geographic location; and/or (9) identify the model of vehicle 108 based upon a photographic image of the vehicle.

In some embodiments, graphics module 334 may be configured to generate graphical interfaces for display at, for example, occupant computing device 110, responder computing device 112, and/or headset 114. For example, graphics module 334 may be configured to generate a user interface including vehicle hazard information and/or generate at least one of an AR or a VR interface including an image of the vehicle and an overlay including at least one indicator of a vehicle hazard.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Connected Vehicle

Figure 4:
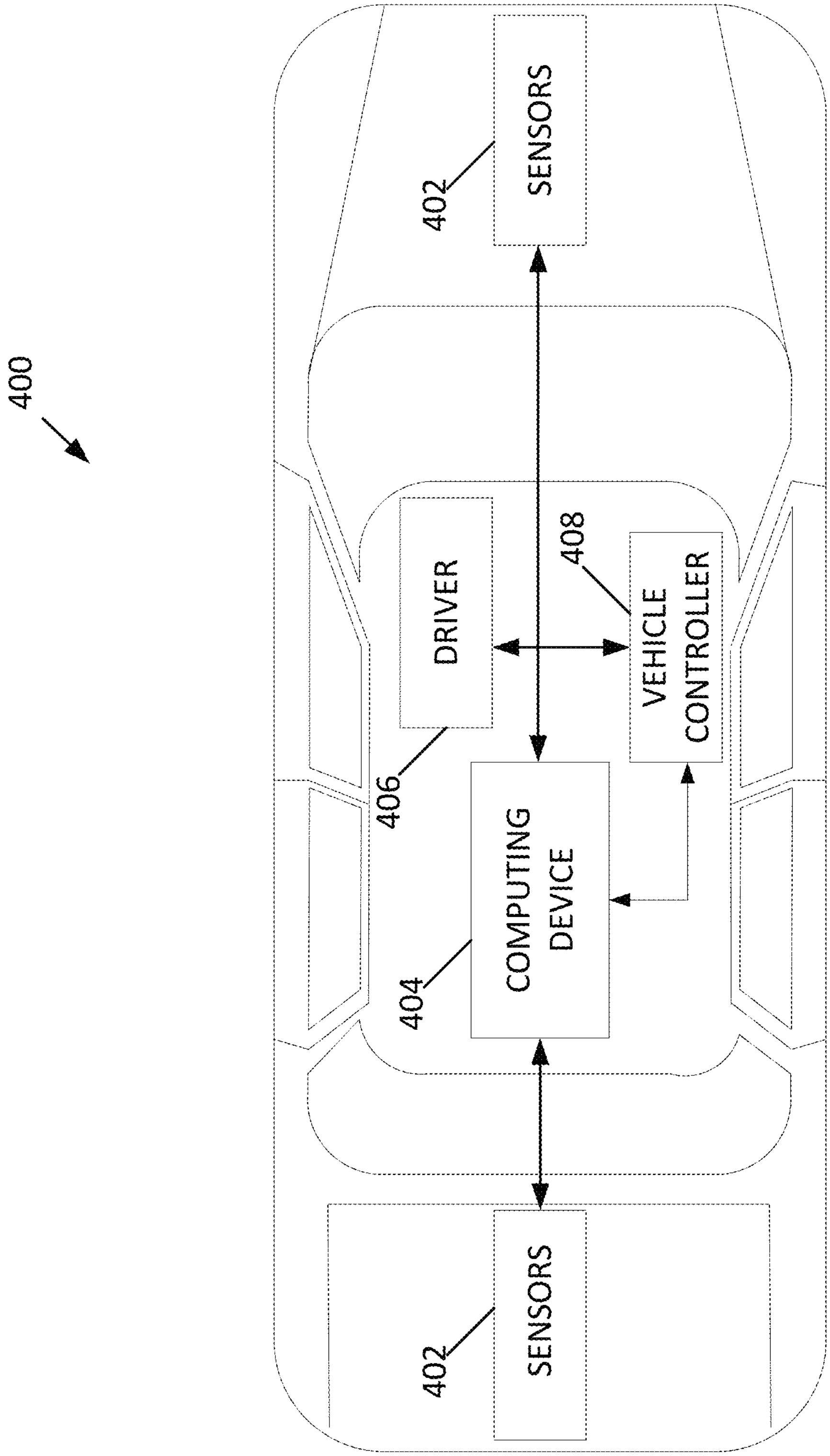
FIG. 4 depicts an exemplary vehicle that may be used with the exemplary computer system illustrated in FIG. 1.

FIG. 4 depicts an exemplary vehicle 400. Vehicle 400 may be, for example, vehicle 108. In some embodiments, vehicle 400 may be a conventional and/or autonomous automobile, a motorcycle, a bicycle, a powered scooter (e.g., an electric scooter), and/or another vehicle.

Vehicle 400 may include a plurality of sensors 402 and a computing device 404. Sensors 402 may include, but are not limited to, temperature sensors, terrain sensors, weather sensors, accelerometers, gyroscopes, radar, LIDAR, Global Positioning System (GPS), video devices, imaging devices, cameras (e.g., 2D and 3D cameras), audio recorders, and computer vision. In some embodiments, sensors 402 may be used to collect, for example, vehicle telematics data, as described above. In addition, sensors 402 may be used to collect additional information, for example, whether any external devices (e.g., occupant computing devices 110) are communicatively linked to and/or otherwise in proximity to vehicle 400.

Such telematics data and/or sensor data collected by sensors 402 may be transmitted to server computing device 102 (shown in FIG. 1). The telematics data may be transmitted, for example, via occupant computing device 110 (shown in FIG. 1), which may be communicatively linked to vehicle 400 (e.g., via a physical dock and/or a wireless connection).

Computing device 404 may be implemented, for example, as client computing device 202 (shown in FIG. 2). In exemplary embodiments, computing device 404 may receive data from sensors 402. In certain embodiments in which server computing device 102 is remote from vehicle 400, computing device 404 may transmit data received from sensors 402 (e.g., vehicle telematics data) to server computing device 102. Alternatively, server computing device 102 may be implemented as computing device 404.

In exemplary embodiments, vehicle controller 408 may control at least some operation of vehicle 400. For example, vehicle controller 408 may steer, accelerate, or decelerate vehicle 400 based upon data received, for example, from sensors 402. In some embodiments, vehicle controller 408 may include a display screen or touchscreen (not shown) that is capable of displaying information to and/or receiving input from driver 406.

In other embodiments, vehicle controller 408 may be capable of wirelessly communicating with a user mobile device such as occupant computing device 110 in vehicle 400. In these embodiments, vehicle controller 408 may be capable of communicating with the user of occupant computing device 110, such as driver 406, through an application on occupant computing device 110. In some embodiments, computing device 404 may include vehicle controller 408.

Exemplary Augmented or Virtual Reality Interface

Figure 5A:
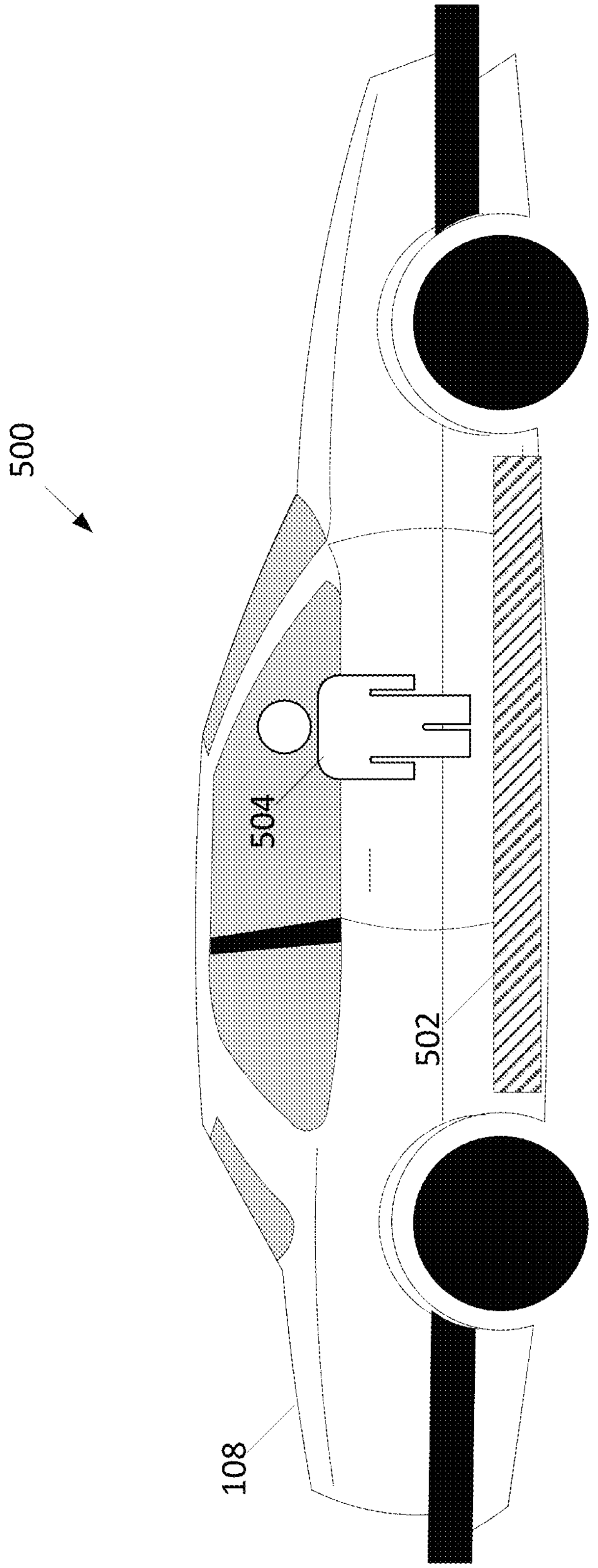
FIG. 5A depicts an exemplary user interface that may be displayed by the exemplary computer system illustrated in FIG. 1.
Figure 5B:
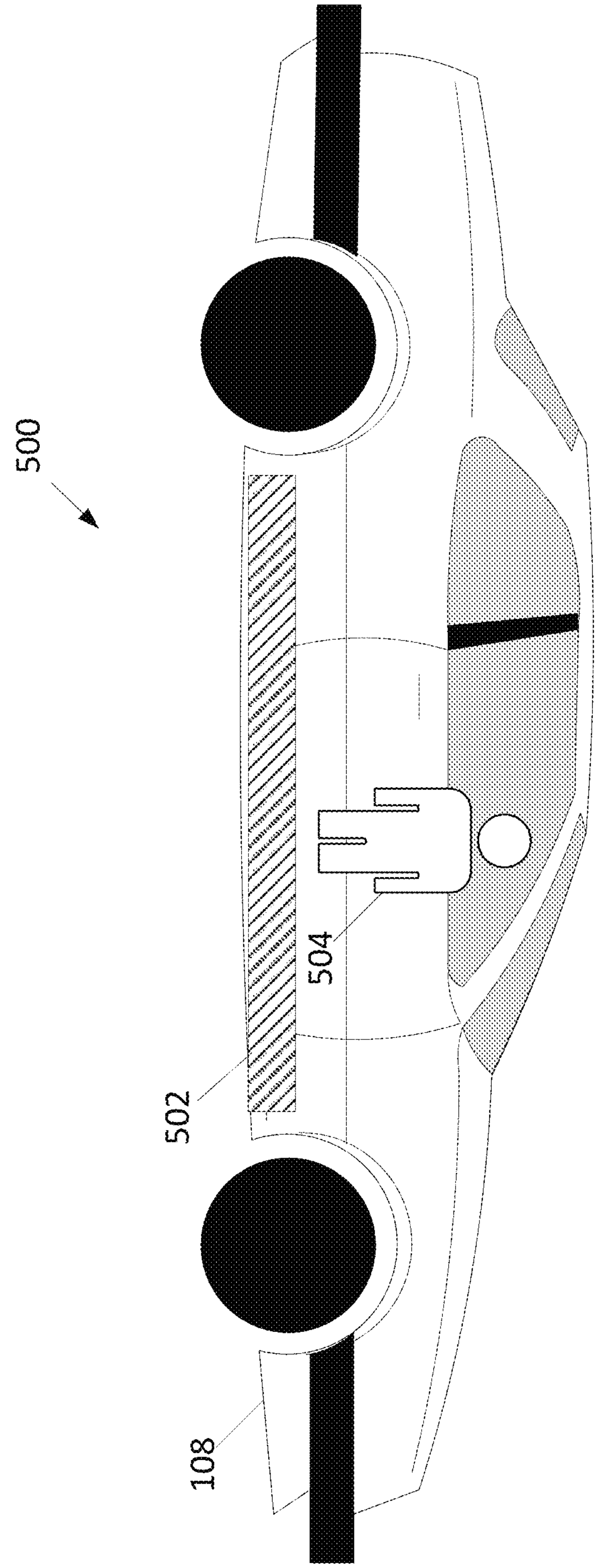
FIG. 5B depicts another exemplary user interface that may be displayed by the exemplary computer system illustrated in FIG. 1.

FIGS. 5A and 5B depict an exemplary AR or VR interface 500. AR or VR interface 500 may be displayed by, for example, a user computing device (e.g., responder computing device 112) and/or an AR or VR headset (e.g., headset 114). A background of AR or VR interface 500 may include photographic imagery captured by, for example, a camera of responder computing device 112 and/or headset 114. This photographic imagery may be continually updated in real time (e.g., by periodically capturing new images with the camera) so that AR or VR interface 500 represents a present view of, for example, the collision site. The background photographic imagery may include a photographic image of vehicle 108. Alternatively, the background imagery including the image of vehicle 108 may be a fixed and/or virtual image. Because a fixed and/or virtual image does need not need to be continually updated, using a fixed and/or virtual image enables rescue personnel to view interface 500 when not present at the collision site.

In addition to the photographic imagery, AR or VR interface 500 may include an overlay of virtual images generated by, for example, server computing device 102, responder computing device 112, and/or headset 114. The virtual images may include, for example, a hazard indicator 502 indicating a location of a hazard (e.g., a high voltage wire, battery, and/or other hazard) within vehicle 108 and/or an occupant indicator 504 indicating a location of an occupant of vehicle 108.

The locations of hazard indicator 502 and/or occupant indicator 504 may be continually refreshed (e.g., a location and/or angle of the camera changes with respect to the location of vehicle 108) so that the locations of hazard indicator 502 and/or occupant indicator 504 correspond to the actual locations of the identified hazards and/or occupants. For example, FIGS. 5A and 5B may illustrate AR or VR interface 500 for the same collision site, but with the camera rotated 180 degrees within a vertical plane. As shown in FIGS. 5A and 5B, the positions of hazard indicator 502 and/or occupant indicator 504 do not change with respect to the position of vehicle 108 when the camera is rotated. In some embodiments, in addition to indicators such as hazard indicator 502 and occupant indicator 504, AR or VR interface may include text overlay providing information about vehicle 108 and/or the hazards or occupants associated with hazard indicator 502 and occupant indicator 504, respectively.

Figure 6A:
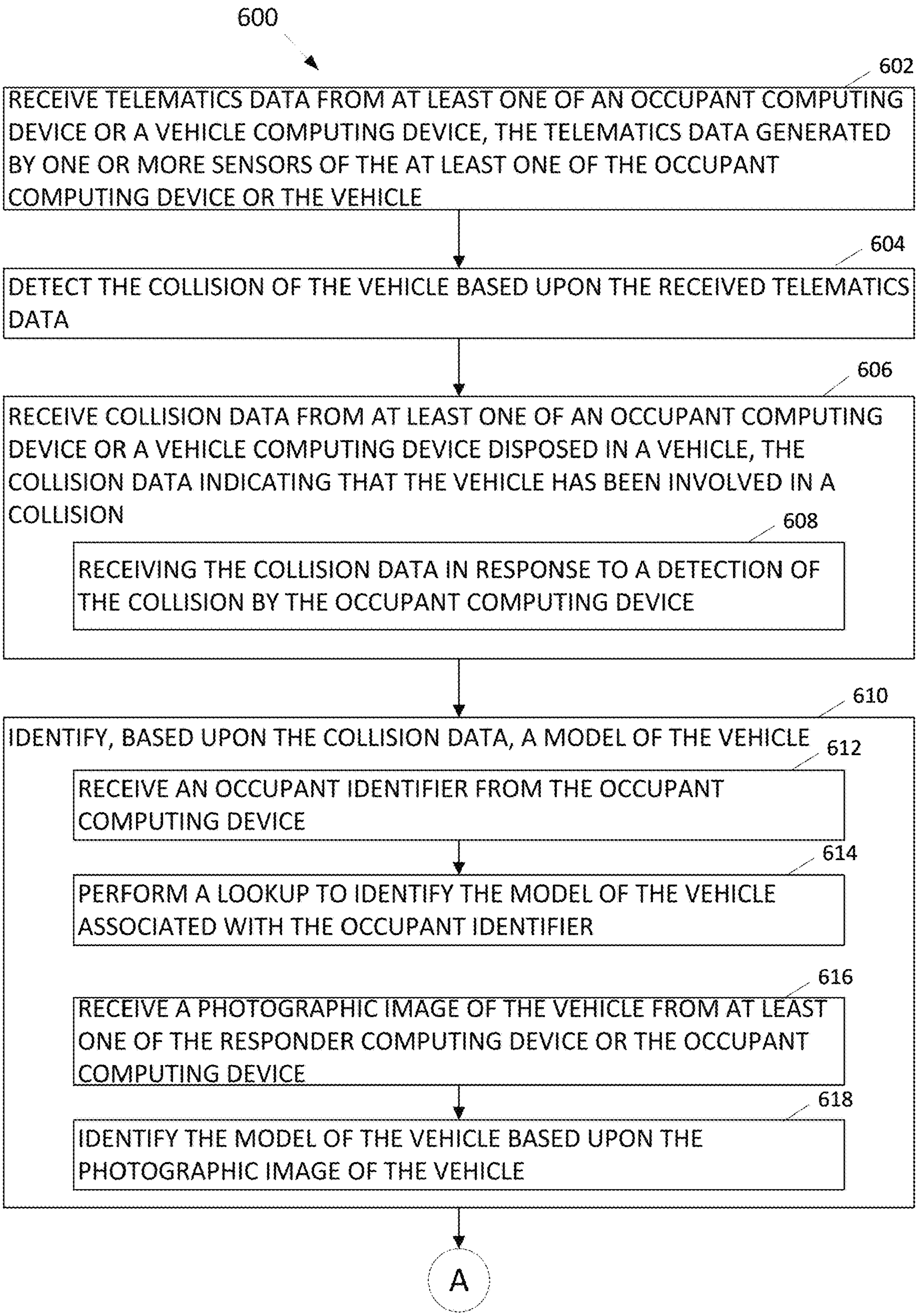
FIG. 6A illustrates an exemplary computer-implemented method for dynamically generating a safety information interface for a vehicle.
Figure 6B:
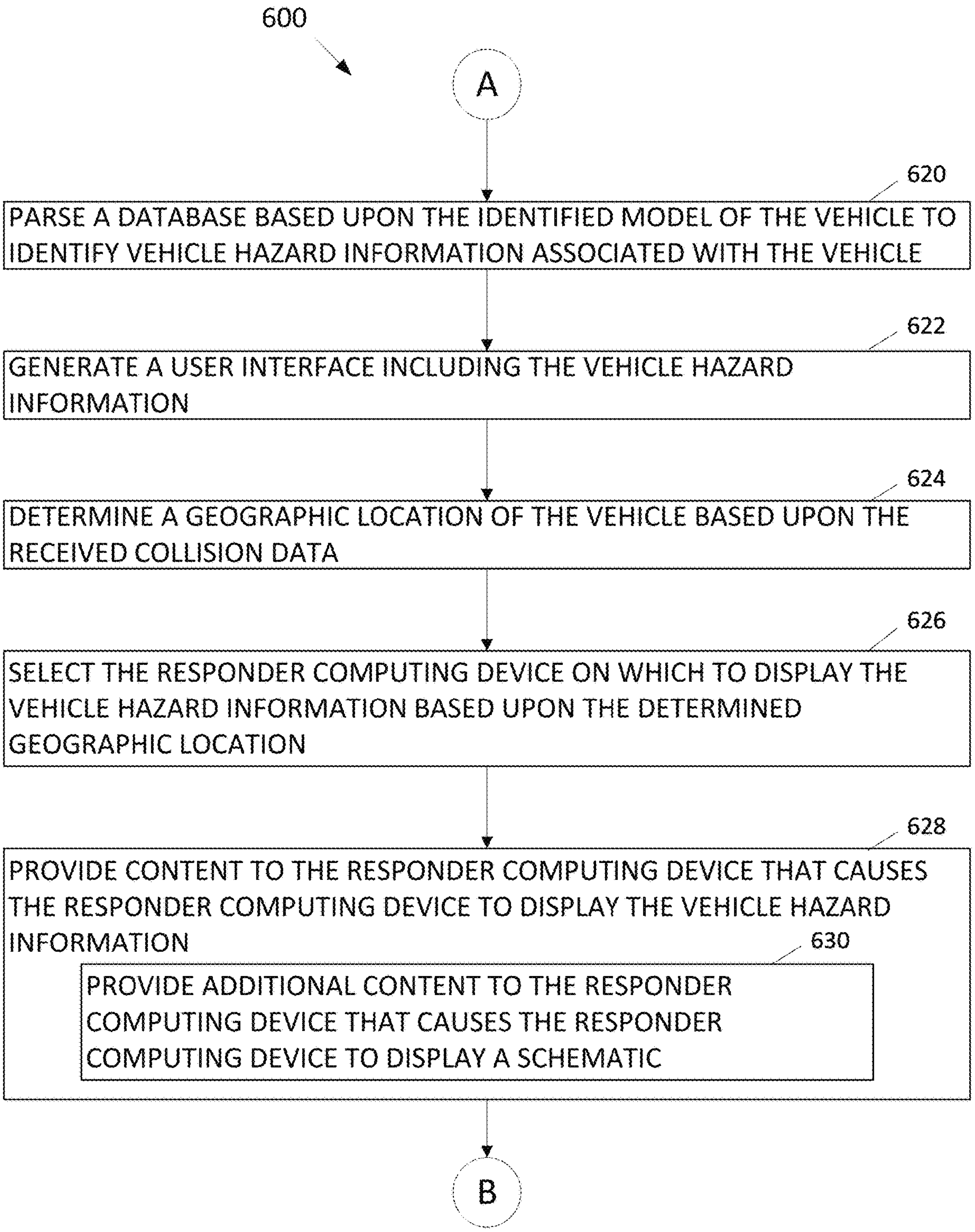
FIG. 6B is a continuation of the exemplary computer-implemented method shown in FIG. 6A.
Figure 6C:
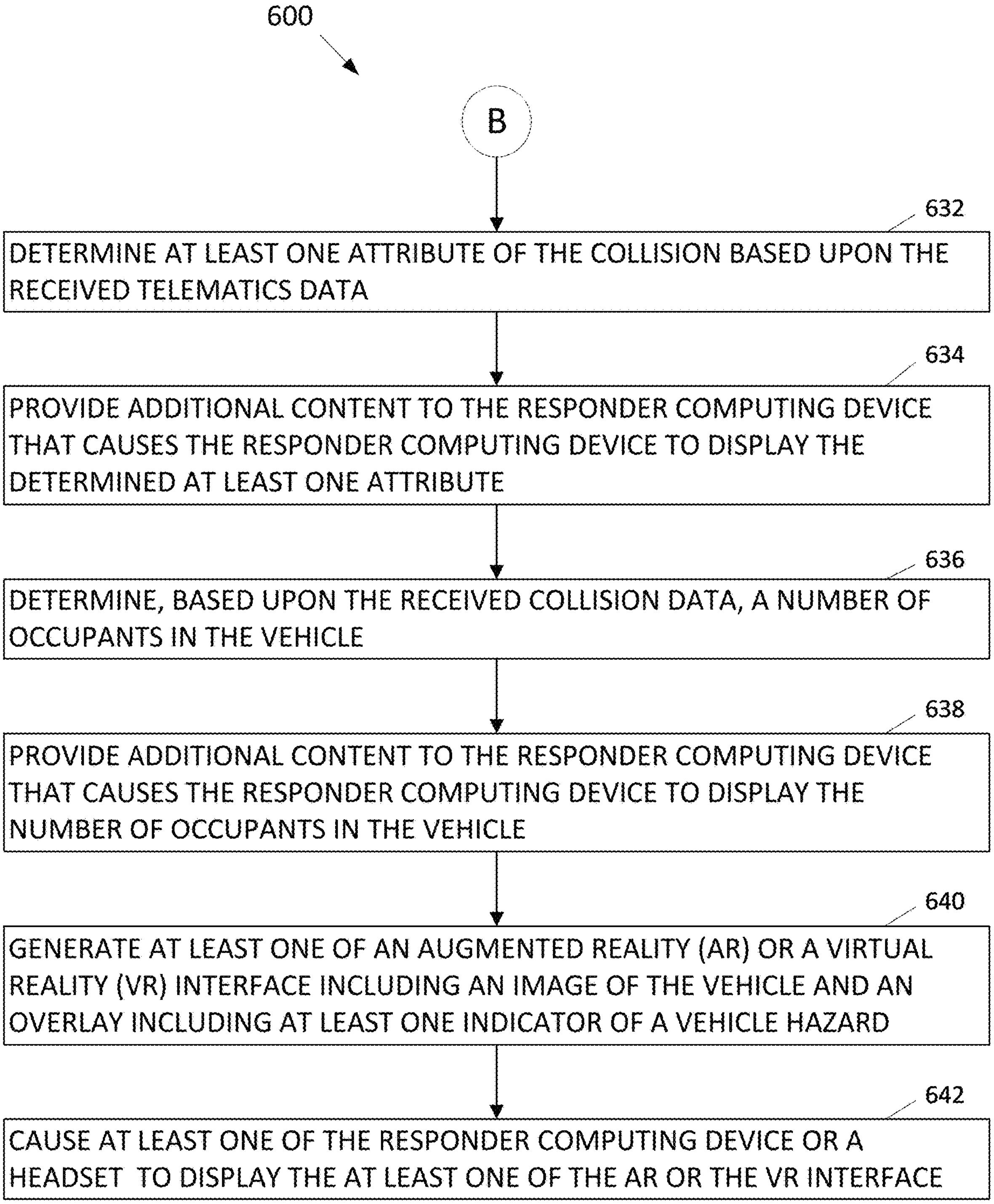
FIG. 6C is a continuation of the exemplary computer-implemented method shown in FIGS. 6A and 6B.

Exemplary Method for Dynamically Generating an Instructional Information Interface FIGS. 6A, 6B, and 6C depict a flowchart illustrating an exemplary computer-implemented method 600 for dynamically generating an instructional information interface based upon collision data. In the exemplary embodiment, method 600 may be performed by a computer system such as computer system 100 (shown in FIG. 1).

In some embodiments, method 600 may include receiving 602 telematics data from at least one of an occupant computing device (e.g., occupant computing device 110 shown in FIG. 1) or a vehicle computing device (e.g., computing device 404 shown in FIG. 4) of a vehicle (e.g., vehicle 108 shown in FIG. 1). The telematics data may be generated by one or more sensors (e.g., sensors 240 shown in FIG. 2 and/or sensors 402 shown in FIG. 4) of the occupant computing device or the vehicle. In such embodiments, method 600 may further include detecting 604 a collision based upon the received telematics data. In such embodiments, receiving 602 telematics data and detecting 604 the collision may be performed by server computing device 102, for example, by executing communication module 330 and analytics module 332, respectively.

Method 600 may further include receiving 606 collision data from at least one of the occupant computing device or the vehicle computing device disposed in the vehicle. The collision data indicates that the vehicle has been involved in a collision. In some embodiments, receiving 606 the collision data may include receiving 608 the collision data in response to a detection of the collision by the occupant computing device and/or the vehicle. In some embodiments, receiving 606 the collision data may be performed by server computing device 102, for example, by executing communication module 330

Method 600 may further include identifying 610, based upon the collision data, a model of the vehicle. In some embodiments, identifying 610 the model of the vehicle may include receiving 612 an occupant identifier from the occupant computing device and performing 614 a lookup to identify the model of the vehicle associated with the occupant identifier. Additionally or alternatively, in some embodiments, identifying 610 the model of the vehicle may include receiving 616 a photographic image of the vehicle from at least one of a responder computing device (e.g., responder computing device 112 shown in FIG. 1) or the occupant computing device and identifying 618 the model of the vehicle based upon the photographic image of the vehicle. In some embodiments, identifying 610 the model of the vehicle may be performed by server computing device 102, for example, by executing analytics module 332.

Method 600 may further include parsing 620 a database based upon the identified model of the vehicle to identify vehicle hazard information associated with the vehicle. In some embodiments, parsing 620 the database may be performed by server computing device 102, for example, by executing analytics module 332.

Method 600 may further include generating 622 a user interface including the vehicle hazard information. In some embodiments, generating 622 the user interface may be performed by server computing device 102, for example, by executing graphics module 334.

In some embodiments, method 600 may further include determining 624 a geographic location of the vehicle based upon the received collision data and selecting 626 a responder computing device on which to display the vehicle hazard information based upon the determined geographic location. In some embodiments, determining 624 the geographic location and selecting 626 a responder computing device may be performed by server computing device 102, for example, by executing analytics module 332.

Method 600 may further include providing 628 content to the responder computing device that causes the responder computing device to display the vehicle hazard information. In some embodiments, the vehicle hazard information includes a schematic of the identified model of the vehicle, and providing 628 the content includes providing 630 content to the responder computing device that causes the responder computing device to display the schematic. In some embodiments, providing 628 the content may be performed by server computing device 102, for example, by executing communication module 330.

In some embodiments, method 600 may further include determining 632 at least one attribute of the collision based upon the received telematics data and providing 634 additional content to the responder computing device that causes the responder computing device to display the determined at least one attribute. In such embodiments, determining 632 the at least one attribute and providing 634 the additional content may be performed by server computing device 102, for example, by executing analytics module 332 and communication module 330, respectively.

In some embodiments, method 600 may further include determining 636, based upon the received collision data, a number of occupants of the vehicle and provide 638 additional content to the responder computing device that causes the responder computing device to display the number of occupants in the vehicle. In such embodiments, determining 636 the number of occupants and providing 638 the additional content may be performed by server computing device 102, for example, by executing analytics module 332 and communication module 330, respectively.

In some embodiments, method 600 may further include generating 640 at least one of an AR or a VR interface including an image of the vehicle and an overlay including at least one indicator of a vehicle hazard and causing 642 at least one of the responder computing device or a headset (e.g., headset 114 shown in FIG. 1) to display the at least one of the AR or the VR interface. In such embodiments, generating 640 the AR or the VR interface and causing 642 the AR or VR interface to be displayed may be performed by server computing device 102, for example, by executing graphics module 334 and communication module 330, respectively.

In some embodiments, method 600 may include more or fewer steps than as shown in FIGS. 6A, 6B, and 6C. Furthermore, the steps of method 600 may not necessarily be performed in the order shown in FIGS. 6A, 6B, and 6C.

Figure 7:
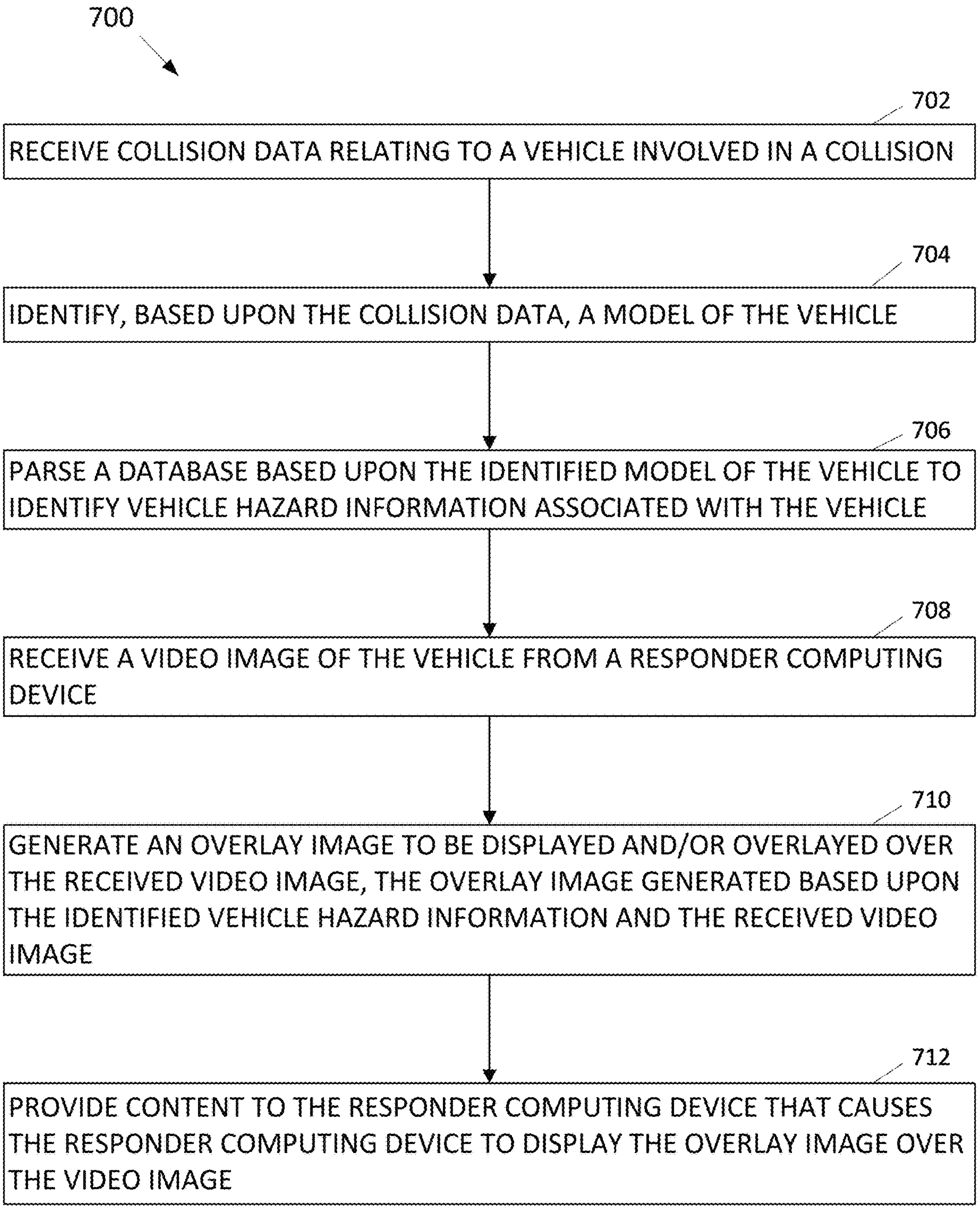
FIG. 7 depicts an exemplary computer-implemented method for generating an augmented reality or virtual reality interface based upon collision data.

Exemplary Method for Generating an Augmented Reality or Virtual Reality Interface Based Upon Collision Data FIG. 7 depicts a flowchart illustrating an exemplary computer-implemented method 700 for generating an AR or VR interface based upon collision data. In the exemplary embodiment, method 600 may be performed by a computer system such as computer system 100 (shown in FIG. 1).

Method 700 may include receiving 702 collision data relating to a vehicle involved in a collision. In some embodiments, receiving 702 the collision data may be performed by server computing device 102, for example, by executing communication module 330.

Method 700 may further include identifying 704, based upon the collision data, a model of the vehicle. In some embodiments, identifying 704 the model of the vehicle may be performed by server computing device 102, for example, by executing analytics module 332.

Method 700 may further include parsing 706 a database based upon the identified model of the vehicle to identify vehicle hazard information associated with the vehicle. In some embodiments, parsing 706 the database may be performed by server computing device 102, for example, by executing analytics module 332.

Method 700 may further include receiving 708 a video image of the vehicle from a responder computing device. In some embodiments, receiving 708 the video image may be performed by server computing device 102, for example, by executing communication module 330.

Method 700 may further include generating 710 an overlay image to be displayed and/or overlayed over the received video image. The overlay image may be generated based upon the identified vehicle hazard information and the received video image. In some embodiments, generating 710 the overlay image the database may be performed by server computing device 102, for example, by executing graphics module 334.

Method 700 may further include providing 712 content to the responder computing device that causes the responder computing device to display the overlay image over the video image. In some embodiments, providing 712 the content may be performed by server computing device 102, for example, by executing communication module 330.

Figure 8:
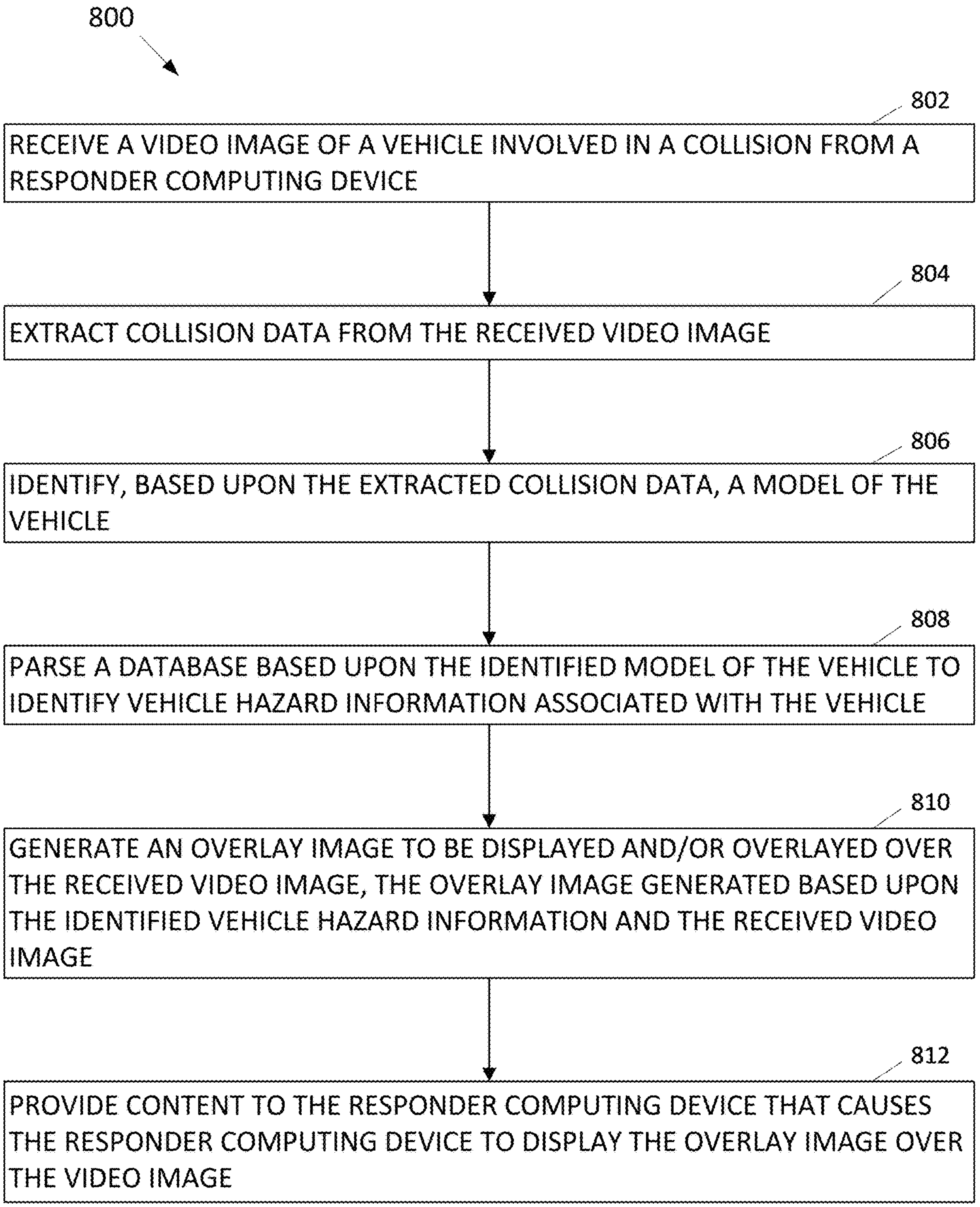
FIG. 8 depicts an exemplary computer-implemented method for generating an augmented reality or virtual reality interface based upon a video image.

Exemplary Method for Generating an Augmented Reality or Virtual Reality Interface Based Upon a Video Image FIG. 8 depicts a flowchart illustrating an exemplary computer-implemented method 800 for generating an AR or VR interface based upon a video image. In the exemplary embodiment, method 600 may be performed by a computer system such as computer system 100 (shown in FIG. 1).

Method 800 may include receiving 802 a video image of a vehicle involved in a collision from a responder computing device. In some embodiments, receiving 802 the video image may be performed by server computing device 102, for example, by executing communication module 330.

Method 800 may further include extracting 804 collision data from the received video image. In some embodiments, extracting 804 the collision data may be performed by server computing device 102, for example, by executing analytics module 332.

Method 800 may further include identifying 806, based upon the extracted collision data, a model of the vehicle. In some embodiments, identifying 806 the model of the vehicle may be performed by server computing device 102, for example, by executing analytics module 332.

Method 800 may further include parsing 808 a database based upon the identified model of the vehicle to identify vehicle hazard information associated with the vehicle. In some embodiments, parsing 808 the database may be performed by server computing device 102, for example, by executing analytics module 332.

Method 800 may further include generating 810 an overlay image to be displayed and/or overlayed over the received video image, the overlay image generated based upon the identified vehicle hazard information and the received video image. In some embodiments, generating 810 the overlay image may be performed by server computing device 102, for example, by executing graphics module 334.

Method 800 may further include providing 812 content to the responder computing device that causes the responder computing device to display the overlay image over the video image. In some embodiments, providing 812 the content may be performed by server computing device 102, for example, by executing communication module 330.

EXEMPLARY EMBODIMENTS

In an exemplary embodiment, a computer system for providing an instructional information interface may be provided. The system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, a computer system may include at least one memory and at least one processor in communication with the at least one memory. The processor may be programmed to: (1) receive collision data indicating that a vehicle has been involved in a collision; (2) identify, based upon the collision data, a model of the vehicle; (3) parse a database based upon the identified model of the vehicle to identify vehicle hazard information associated with the vehicle; (4) generate a user interface including the vehicle hazard information; and/or (5) provide content to a responder computing device that causes the responder computing device to display the vehicle hazard information. The computer system may include additional, less, or alternate functionality, including that discussed elsewhere herein.

In another exemplary embodiment, a server computing device for providing an instructional information interface may be provided. The server computing device may include a processor in communication with a memory device. The processor may be configured to receive collision data from at least one of an occupant computing device or a vehicle computing device disposed in a vehicle, the collision data indicating that the vehicle has been involved in a collision. The processor may be further configured to identify, based upon the collision data, a model of the vehicle. The processor may be further configured to parse a database based upon the identified model of the vehicle to identify vehicle hazard information associated with the vehicle. The processor may be further configured to generate a user interface including the vehicle hazard information. The processor may be further configured to provide content to a responder computing device that causes the responder computing device to display the vehicle hazard information. The server computing device may include additional, less, or alternate functionality, including that discussed elsewhere herein.

In another exemplary embodiment, a computer-implemented method for dynamically generating a safety information interface for a vehicle may be provided. The computer-implemented method may be implemented via one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the method may be performed by a server computing device including a processor in communication with a memory device. The computer-implemented may include (1) receiving, by the server computing device, collision data from at least one of an occupant computing device or a vehicle computing device disposed in the vehicle, the collision data indicating that the vehicle has been involved in a collision. The computer-implemented method may further include (2) identifying, by the server computing device, based upon the collision data, a model of the vehicle; and/or (3) parsing, by the server computing device, a database based upon the identified model of the vehicle to identify vehicle hazard information associated with the vehicle. The computer-implemented method may further include (4) generating, by the server computing device, a user interface including the vehicle hazard information; and/or (5) providing, by the server computing device, content to a responder computing device that causes the responder computing device to display the vehicle hazard information. The computer-implemented method may include additional, less, or alternate functionality, including that discussed elsewhere herein.

In another exemplary embodiment, at least one non-transitory computer-readable storage media having computer-executable instructions embodied thereon may be provided. When executed by a server computing device including a processor in communication with a memory device, the computer-executable instructions may cause the processor to receive collision data from at least one of an occupant computing device or a vehicle computing device disposed in a vehicle, the collision data indicating that the vehicle has been involved in a collision. The computer-executable instructions may further cause the processor to identify, based upon the collision data, a model of the vehicle. The computer-executable instructions may further cause the processor to parse a database based upon the identified model of the vehicle to identify vehicle hazard information associated with the vehicle. The computer-executable instructions may further cause the processor to generate a user interface including the vehicle hazard information. The computer-executable instructions may further cause the processor to provide content to a responder computing device that causes the responder computing device to display the vehicle hazard information. The at least one non-transitory computer-readable storage media may include additional, less, or alternate functionality, including that discussed elsewhere herein.

In another exemplary embodiment, a computing device may be provided. The computing device may include a processor in communication with a memory device is provided. The processor may be configured to receive collision data relating to a vehicle involved in a collision. The processor may further be configured to identify, based upon the collision data, a model of the vehicle. The processor may further be configured to parse a database based upon the identified model of the vehicle to identify vehicle hazard information associated with the vehicle. The processor may further be configured to receive a video image of the vehicle from a responder computing device. The processor may further be configured to generate an overlay image to be displayed or overlayed (or displayed overlayed) over the received video image, the overlay image generated based upon the identified vehicle hazard information and the received video image. The processor may further be configured to provide content to the responder computing device that causes the responder computing device to display the overlay image over the video image. The computing device may include additional, less, or alternate functionality, including that discussed elsewhere herein.

In some embodiments, the responder computing device includes a projector, and the processor is further configured to cause the responder computing device to project, using the projector, the overlay image onto the vehicle.

In another exemplary embodiment, a computing device may be provided. The computing device may include a processor in communication with a memory device. The processor may be configured to receive a video image of a vehicle involved in a collision from a responder computing device. The processor may further be configured to extract collision data from the received video image. The processor may further be configured to identify, based upon the extracted collision data, a model of the vehicle. The processor may further be configured to parse a database based upon the identified model of the vehicle to identify vehicle hazard information associated with the vehicle. The processor may further be configured to generate an overlay image to be displayed or overlayed (or displayed overlayed) over the received video image, the overlay image generated based upon the identified vehicle hazard information and the received video image. The processor may further be configured to provide content to the responder computing device that causes the responder computing device to display the overlay image over the video image. The computing device may include additional, less, or alternate functionality, including that discussed elsewhere herein.

In some embodiments, the responder computing device includes a projector, and the processor is further configured to cause the responder computing device to project, using the projector, the overlay image onto the vehicle.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, server computing device 102 is configured to implement machine learning, such that server computing device 102 "learns" to analyze, organize, and/or process data without being explicitly programmed. Machine learning may be implemented through machine learning ("ML") methods and algorithms ("ML methods and algorithms"). In one exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to collision data, telematics data, and/or user input received from, for example, vehicle 108, occupant computing device 110, responder computing device 112, and/or headset 114. ML outputs may include but are not limited to predicted locations of hazards and/or occupants within vehicle 108. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of data with known characteristics or features.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

For instance, in some embodiments, supervised or unsupervised learning techniques may be followed or used in conjunction with reinforced or reinforcement learning techniques.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program may be provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for dynamically generating a safety information interface for a vehicle, the computing device remote from the vehicle and comprising a processor in communication with a memory device, the processor configured to:

receive collision data from at least one of an occupant computing device or a vehicle computing device disposed in the vehicle, the collision data indicating that the vehicle has been involved in a collision;

identify, based upon the collision data, a model of the vehicle;

parse a database based upon the identified model of the vehicle to identify vehicle hazard information associated with the vehicle, the vehicle hazard information including one or more locations on the vehicle recommended to be avoided by a responder;

generate a user interface including the vehicle hazard information; and provide content to a responder computing device that causes the responder computing device to display the vehicle hazard information.

2. The computing device of claim 1, wherein the processor is further configured to:

receive telematics data from at least one of the occupant computing device or the vehicle computing device, the telematics data generated by one or more sensors of the at least one of the occupant computing device or the vehicle; and detect the collision of the vehicle based upon the received telematics data.

3. The computing device of claim 2, wherein the processor is further configured to:

determine at least one attribute of the collision based upon the received telematics data; and provide additional content to the responder computing device that causes the responder computing device to display the determined at least one attribute.

4. The computing device of claim 1, wherein the processor is further configured to receive the collision data in response to a detection of the collision by at least one of the occupant computing device or the vehicle.

5. The computing device of claim 1, wherein the processor is further configured to:

receive an occupant identifier from the occupant computing device; and perform a lookup to identify the model of the vehicle associated with the occupant identifier.

6. The computing device of claim 1, wherein the vehicle hazard information includes a schematic of the identified model of the vehicle, and wherein the processor is further configured to provide additional content to the responder computing device that causes the responder computing device to display the schematic.

7. The computing device of claim 1, wherein the processor is further configured to:

determine, based upon the received collision data, a number of occupants in the vehicle; and provide additional content to the responder computing device that causes the responder computing device to display the number of occupants in the vehicle.

8. The computing device of claim 1, wherein the processor is further configured to:

determine a geographic location of the vehicle based upon the received collision data; and select the responder computing device on which to display the vehicle hazard information based upon the determined geographic location.

9. The computing device of claim 1, wherein the processor is further configured to:

generate at least one of an augmented reality (AR) or a virtual reality (VR) interface including an image of the vehicle and an overlay including at least one indicator of a vehicle hazard; and cause at least one of the responder computing device or a headset to display the at least one of the AR or the VR interface.

10. The computing device of claim 1, wherein the processor is further configured to:

receive a photographic image of the vehicle from at least one of the responder computing device or the occupant computing device; and identify the model of the vehicle based upon the photographic image of the vehicle.

11. A computer-implemented method for dynamically generating a safety information interface for a vehicle, the computer-implemented method performed by a server computing device remote from the vehicle and including a processor in communication with a memory device, the computer-implemented method comprising:

receiving, by the server computing device, collision data from at least one of an occupant computing device or a vehicle computing device disposed in the vehicle, the collision data indicating that the vehicle has been involved in a collision;

identifying, by the server computing device, based upon the collision data, a model of the vehicle;

parsing, by the server computing device, a database based upon the identified model of the vehicle to identify vehicle hazard information associated with the vehicle, the vehicle hazard information including one or more locations on the vehicle recommended to be avoided by a responder;

generating, by the server computing device, a user interface including the vehicle hazard information; and providing, by the server computing device, content to a responder computing device that causes the responder computing device to display the vehicle hazard information.

12. The computer-implemented method of claim 11, further comprising:

receiving, by the server computing device, telematics data from at least one of the occupant computing device or the vehicle computing device, the telematics data generated by one or more sensors of the at least one of the occupant computing device or the vehicle; and detecting, by the server computing device, the collision of the vehicle based upon the received telematics data.

13. The computer-implemented method of claim 11, further comprising receiving, by the server computing device, the collision data in response to a detection of the collision by at least one of the occupant computing device or the vehicle.

14. The computer-implemented method of claim 11, further comprising:

receiving, by the server computing device, an occupant identifier from the occupant computing device; and performing, by the server computing device, a lookup to identify the model of the vehicle associated with the occupant identifier.

15. The computer-implemented method of claim 11, wherein the vehicle hazard information includes a schematic of the identified model of the vehicle, and wherein the computer-implemented method further comprises providing, by the server computing device, additional content to the responder computing device that causes the responder computing device to display the schematic.

16. The computer-implemented method of claim 11, further comprising determining, by the server computing device, based upon the received collision data, a number of occupants in the vehicle; and providing, by the server computing device, additional content to the responder computing device that causes the responder computing device to display the number of occupants in the vehicle.

17. The computer-implemented method of claim 11, further comprising:

determining, by the server computing device, a geographic location of the vehicle based upon the received collision data; and selecting, by the server computing device, the responder computing device on which to display the vehicle hazard information based upon the determined geographic location.

18. The computer-implemented method of claim 11, further comprising:

generating, by the server computing device, at least one of an augmented reality (AR) or a virtual reality (VR) interface including an image of the vehicle and an overlay including at least one indicator of a vehicle hazard; and causing, by the server computing device, at least one of the responder computing device or a headset to display the at least one of the AR or the VR interface.

19. The computer-implemented method of claim 11, further comprising:

receiving, by the server computing device, a photographic image of the vehicle from at least one of the responder computing device or the occupant computing device; and identifying, by the server computing device, the model of the vehicle based upon the photographic image of the vehicle.

20. At least one non-transitory computer-readable storage media having computer-executable instructions embodied thereon, wherein when executed by a server computing device for dynamically generating a safety information interface for a vehicle, the server computing device remote from the vehicle and including a processor in communication with a memory device, the computer-executable instructions cause the processor to:

receive collision data from at least one of an occupant computing device or a vehicle computing device disposed in the vehicle, the collision data indicating that the vehicle has been involved in a collision;

identify, based upon the collision data, a model of the vehicle;

parse a database based upon the identified model of the vehicle to identify vehicle hazard information associated with the vehicle, the vehicle hazard information including one or more locations on the vehicle recommended to be avoided by a responder;

generate a user interface including the vehicle hazard information; and provide content to a responder computing device that causes the responder computing device to display the vehicle hazard information.

* * * * *